(12) United States Patent
French et al.

(10) Patent No.: US 12,695,357 B2
(45) Date of Patent: Jul. 28, 2026

(54) SYSTEMS AND METHODS FOR POWER GENERATION, TRANSMISSION, AMPLIFICATION AND/OR STORAGE

(71) Applicant: Green Lab IP Nominee Pty Ltd, Sydney (AU)

(72) Inventors: Eon French, Victoria (AU); Glenn Edmonds, New South Wales (AU); Andrew French, Victoria (AU)

(73) Assignee: Green Lab IP Nominee Pty Ltd, Sydney (AU)

( * ) Notice: Subject to any disclaimer, the term of this patent is extended or adjusted under 35 U.S.C. 154(b) by 69 days.

(21) Appl. No.: 18/570,204

(22) PCT Filed: Jun. 16, 2022

(86) PCT No.: PCT/AU2022/050601
§ 371 (c)(1),
(2) Date: Dec. 14, 2023

(87) PCT Pub. No.: WO2022/261714
PCT Pub. Date: Dec. 22, 2022

(65) Prior Publication Data
US 2024/0283326 A1 Aug. 22, 2024

(30) Foreign Application Priority Data

Jun. 16, 2021 (AU) ................................ 2021901797
May 23, 2022 (AU) ................................ 2022901379

(51) Int. Cl.
*H02K 7/02* (2006.01)
*H02K 7/09* (2006.01)
(Continued)

(52) U.S. Cl.
CPC ............. *H02K 7/1846* (2013.01); *H02K 7/02* (2013.01); *H02K 7/09* (2013.01); *H02K 7/116* (2013.01); *H02K 49/06* (2013.01); *H02K 49/102* (2013.01)

(58) Field of Classification Search
CPC .......... H02K 7/1846; H02K 7/02; H02K 7/09; H02K 7/116; H02K 49/06; H02K 49/102;
(Continued)

(56) References Cited

U.S. PATENT DOCUMENTS

| | | | |
|---|---|---|---|
| 1,254,694 | A | 1/1918 | Humphries |
| 2,243,555 | A | 5/1941 | Faus |

(Continued)

FOREIGN PATENT DOCUMENTS

| | | |
|---|---|---|
| CN | 110752733 | 2/2020 |
| CN | 111478550 | 7/2020 |

(Continued)

OTHER PUBLICATIONS

International Preliminary Report on Patentability Dated Jul. 5, 2023 From the International Preliminary Examining Authority Re. Application No. PCT/AU2022/050601. (29 Pages).

(Continued)

*Primary Examiner* — Farhana Pervin

(57) ABSTRACT

A machine (101) including a vertical rotatable shaft (4*b*) levitated by magnets (5) so as to minimize frictional losses. Magnets (5) are arranged on the machine body (7) and/or the shaft (4*b*) of the machine (101) to thereby exert a repelling force so that the rotating shaft (4*b*) is uplifted against gravitational forces. The machine (101) may additionally or alternatively incorporate a magnetic bearing (6), a variable inertia flywheel (24), a magnetic gear (29), and/or a magnetic clutch (19). The magnetic gear (29) may incorporate arrow shaped magnets (28).

16 Claims, 9 Drawing Sheets

(51) Int. Cl.

| | |
|---|---|
| *H02K 7/116* | (2006.01) |
| *H02K 7/18* | (2006.01) |
| *H02K 49/06* | (2006.01) |
| *H02K 49/10* | (2006.01) |

(58) Field of Classification Search
CPC ........ H02K 7/025; H02K 7/183; H02K 49/10;
H02K 7/18; H02K 5/12; H02K 49/104;
F16C 2361/55; F16C 2361/61; F16C
2380/28; F16C 32/0427; F16C 32/0429;
F16C 32/0476; F16C 32/0485; F16C
32/0423; F16F 15/31; H02N 15/00
See application file for complete search history.

(56) References Cited

U.S. PATENT DOCUMENTS

| | | | |
|---|---|---|---|
| 2,403,478 A | 7/1946 | Burnat | |
| 2,983,349 A | 5/1961 | Meiklejohn | |
| 6,703,735 B1 | 3/2004 | Gabrys | |
| 6,727,616 B1* | 4/2004 | Gabrys | F16C 32/0417 |
| | | | 310/90 |
| 6,897,587 B1* | 5/2005 | McMullen | H02K 7/09 |
| | | | 310/90.5 |
| 7,679,245 B2 | 3/2010 | Brackett et al. | |
| 2004/0041479 A1 | 3/2004 | French | |
| 2011/0259143 A1 | 10/2011 | Murphy | |
| 2011/0266902 A1 | 11/2011 | Whitfield et al. | |
| 2011/0291507 A1* | 12/2011 | Post | F16C 32/0427 |
| | | | 310/90.5 |
| 2013/0015825 A1 | 1/2013 | Pullen | |
| 2014/0076099 A1 | 3/2014 | Murphy | |
| 2014/0197707 A1 | 7/2014 | French | |
| 2015/0162799 A1 | 6/2015 | Ilan et al. | |
| 2015/0364981 A1 | 12/2015 | Reinosa et al. | |
| 2018/0278102 A1 | 9/2018 | Shirokov | |
| 2018/0351446 A1 | 12/2018 | Wong | |
| 2019/0249749 A1 | 8/2019 | Maiullo | |
| 2024/0275235 A1* | 8/2024 | Bica | H02J 3/30 |

FOREIGN PATENT DOCUMENTS

| | | |
|---|---|---|
| GB | 2102532 | 2/1983 |
| JP | 58-61325 | 4/1983 |
| JP | 59-001838 | 1/1984 |
| JP | 59-026642 | 2/1984 |
| JP | 07-269604 | 10/1995 |
| JP | 2012-522191 | 9/2012 |
| WO | WO 2008/085931 | 7/2008 |
| WO | WO 2010/109210 | 9/2010 |
| WO | WO 2012/044791 | 4/2012 |
| WO | WO 2022/261714 | 12/2022 |

OTHER PUBLICATIONS

International Search Report and the Written Opinion Dated Sep. 19, 2022 From the International Searching Authority Re. Application No. PCT/AU2022/050601. (22 Pages).

Supplementary European Search Report and the European Search Opinion Dated Mar. 21, 2025 From the European Patent Office Re. Application No. 22823688.1. (12 Pages).

Office Action Dated May 10, 2026 From the Israel Patent Office Re. Application No. 309365. (6 Pages).

* cited by examiner

SECTION A

SECTION B

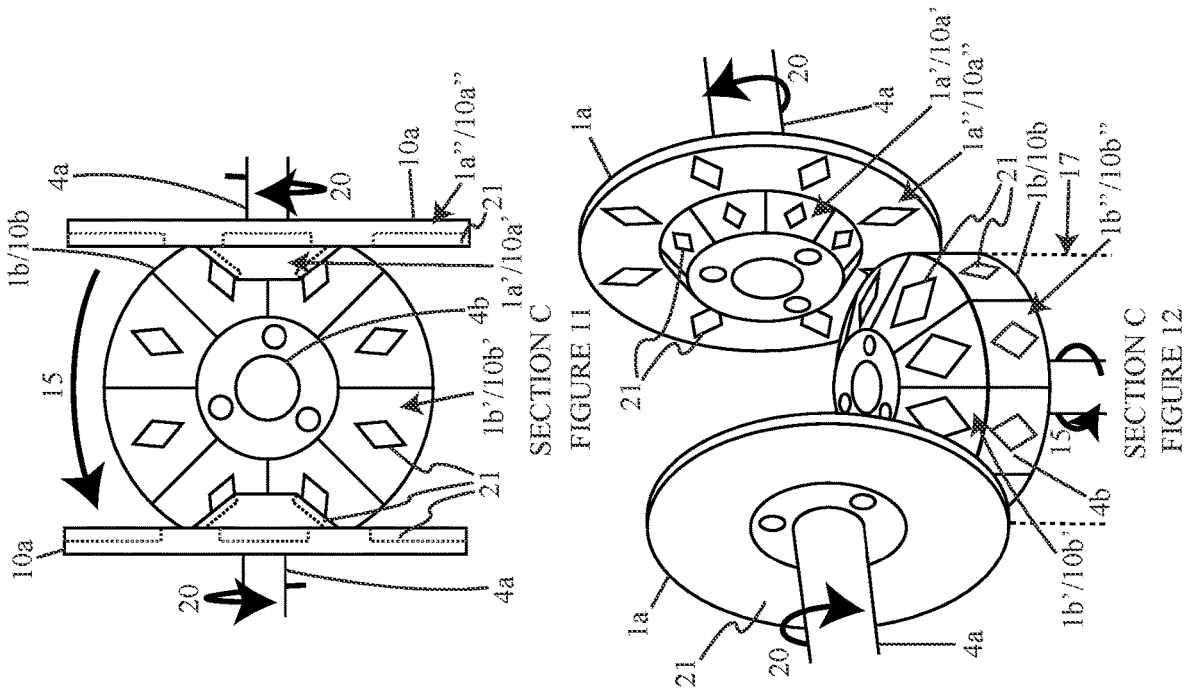
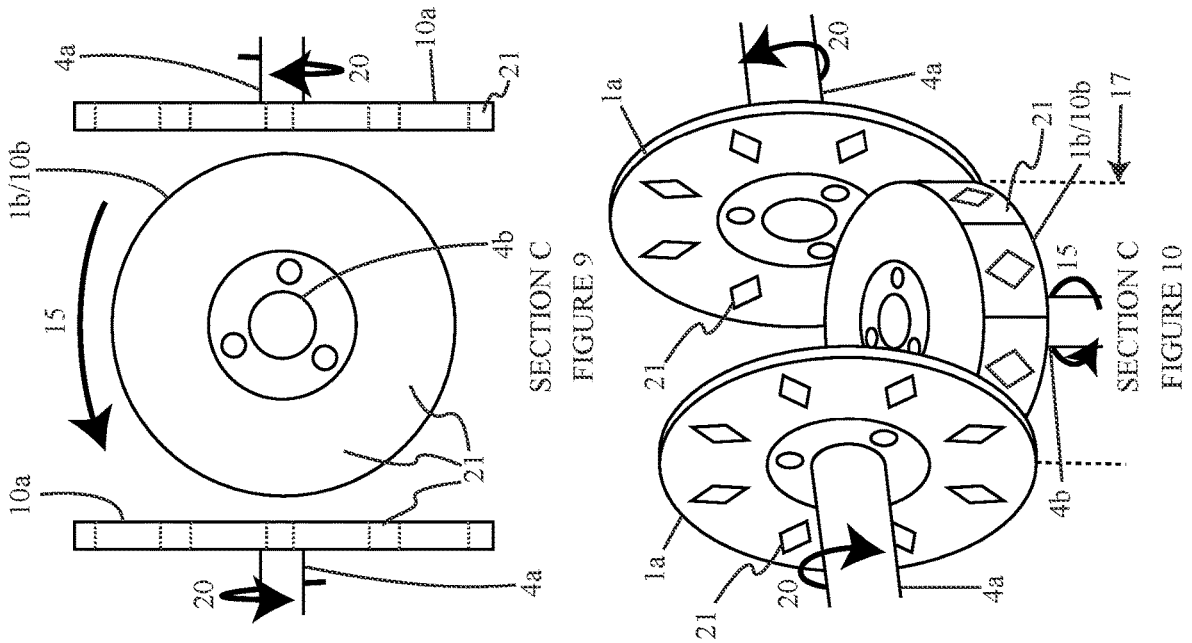

SECTION D2

SECTION D1

SECTION D

SECTION D

SECTION E1

SECTION E1

SECTION E1

SECTION E1

SECTION E

SECTION F1

SECTION F1

SYSTEMS AND METHODS FOR POWER GENERATION, TRANSMISSION, AMPLIFICATION AND/OR STORAGE

RELATED APPLICATIONS

This application is a National Phase of PCT Patent Application No. PCT/AU2022/050601 having International filing date of Jun. 16, 2022, which claims the benefit of priority of Australia Patent Application Nos. 2022901379 filed on May 23, 2022 and 2021901797 filed on Jun. 16, 2021. The contents of the above applications are all incorporated by reference as if fully set forth herein in their entirety.

FIELD AND BACKGROUND OF THE INVENTION

The present invention relates to systems and methods for power generation, transmission, amplification and storage. In particular, the present invention relates to an apparatus, system and method for transmitting energy within a machine from a primary shaft to a secondary shaft via magnetically-induced rotation, for amplifying energy using magnetically-levitated flywheels, and/or for driving machinery with the amplified induced energy via magnetically-induced rotation.

The present invention further relates to a magnetic bearing assembly for use in a machine incorporating a magnetic bearing assembly, to a magnetic clutch device which may be incorporated in a machine, and, to a fluid filled flywheel which may be incorporated in a machine, each of which may be used separately or in combination.

Any reference herein to known prior art does not, unless the contrary indication appears, constitute an admission that such prior art is commonly known by those skilled in the art to which the invention relates, at the priority date of this application.

Traditional machines experience significant energy losses due to friction and heat losses, etc., due to the gearing, the coupling or bearing arrangements incorporated therein. In recent times, some attempts have been made to incorporate magnets in machines seeking to minimise such losses, however, these have been largely unsuccessful.

SUMMARY OF THE INVENTION

The present invention seeks to overcome at least some of the disadvantages of these aforementioned problems.

In one broad form, the present invention relates to a machine including a rotatable shaft, which is adapted to rotate, and which is substantially vertically disposed, the machine including:

a pair of magnets adapted to cooperate with one another so as to exert a repelling force therebetween and thereby levitate at least a portion of said rotatable shaft.

In an example embodiment, at least one of said magnets is a permanent magnet and/or an electromagnet.

Preferably, the pair of magnets are annular ring shaped magnets.

Preferably, the machine further includes a rotatable mass positioned on the rotatable shaft.

Preferably, the rotatable mass are flywheels embedded with permanent magnets and/or electromagnets.

Preferably, the rotatable mass includes an energy harvesting apparatus.

Preferably, the energy harvesting apparatus includes any one or combination of:

an electric coil apparatus, via which an electric current is induced to flow when said apparatus is rotated; and a secondary rotatable shaft, which is rotated via repulsion or attraction of magnets embedded therein.

Preferably, the rotatable shaft is rotated by a drive mechanism, including, but not limited to, a motor, generator, wind turbine, or a magnetic coupling device.

Preferably, the machine further includes magnetic gears.

Preferably, the machine further includes one or more flywheel embedded with permanent magnets and/or electromagnets, adapted to rotate in said rotatable shaft.

Preferably, the pair of magnets is embodied as a magnetic bearing, adapted to align the rotatable shaft in a substantially vertical position, the magnetic bearing including:

an upper magnetic bearing portion; and a lower magnetic bearing portion adapted to cooperate with the upper magnetic bearing portion so as to exert a repelling force to the upper magnetic bearing portion and thereby levitate at least a portion of said rotatable shaft.

Preferably, the upper magnetic bearing portion is associated with the rotatable shaft.

Preferably, the lower magnetic bearing portion is associated with a shaft hole of a machine body.

Preferably, the upper magnetic bearing is convex, conical or like curved shaped, and the lower magnetic bearing is of complementary shape, such as concave, hemispherical cavity, conical cavity or other complementary curved shape.

In a further broad form, the present invention relates to a magnetic bearing assembly, configured to support a substantially vertically disposed rotatable shaft within a shaft hole of a machine body, said magnetic bearing including:

a first magnetic bearing portion associated with said shaft hole of said machine body; and, a second magnetic bearing portion associated with said rotatable shaft;

wherein, said bearing portions are magnetised to exert a repelling force therebetween, such that said rotatable shaft is levitated within said machine body.

Preferably, said magnetic bearing portions are of complementary annular/ring shape such that said rotatable shaft is rotatably balanced within said hole of said machine body.

Preferably:

one end of one of said bearing portions is shaped to include any of a linear or non-linear tapered end section, a convergent or divergent shaped end section, a convex or concave end section, a conical or hemispherical end section, or any other shaped end section; and, the other of said bearing portions is shaped to be of a compatible shape so that the adjacent surfaces of the bearings complement each other.

Preferably, each said magnetic bearing portion includes a permanent magnet and/or an electromagnet.

Preferably, each magnetic bearing portion is either embedded within, formed integrally with, or, fitted to the rotatable shaft of the machine shaft hole.

In a further broad form, the present invention relates to a machine including a rotatable shaft which is substantially vertically disposed and adapted to rotate with a shaft hole of a machine body, the machine including:

a magnetic bearing assembly including:

a first magnetic bearing portion associated with said shaft hole of said machine body; and, a second magnetic bearing portion associated with said rotatable shaft, wherein, in use, said magnetic bearing portions exert a repelling force therebetween, such that said rotatable shaft is levitated within said machine body.

Preferably, said magnetic bearing portions are of complementary annular/ring shape such that said rotatable shaft is rotatably balanced within said hole of said machine body.

Preferably:

one end of one of said bearing portions is shaped to include any of a linear or non-linear tapered end section, a convergent or divergent shaped end section, a convex or concave end section, a conical or hemispherical end section, or any other shaped end section; and, the other of said bearing portions is shaped to be of a compatible shape so that the adjacent surfaces of the bearings complement each other.

Preferably, each said magnetic bearing portion includes a permanent magnet and/or an electromagnet.

Preferably, the machine further includes a rotatable mass positioned above said bearing assembly on said rotatable shaft.

Preferably, the rotatable mass is embodied as one or more flywheel embedded with permanent magnets and/or electromagnets.

Preferably, the rotatable mass includes an energy harvesting apparatus.

Preferably, said energy harvesting apparatus includes, any one or combination of:

an electric coil apparatus, via which an electric current is induced to flow as said apparatus is rotated; and, a secondary rotatable shaft, which is rotated via repulsion or attraction of magnets embedded therein as said flywheel rotates.

Preferably, said rotatable shaft is rotated by a drive mechanism, including, but not limited to, a motor, a generator, a wind turbine, or a magnetic coupling device.

Preferably, the machine further includes magnetic gears.

In a further broad form, the present invention relates to a magnetic clutch device adapted to induce rotation of a second shaft from the rotation of the first shaft, the magnetic clutch device comprising:

a first interface, adapted to connect the magnetic clutch device to an end the first shaft, the end of the first shaft being embedded with a first magnet magnetically; and a second interface, to adapted to connect the magnetic clutch device to an end of the second shaft, the end of the second shaft being embedded with a second magnet.

Preferably, the magnetic clutch device further comprises a mixture which includes:

a magnetic particulate material, such as iron filings; and a liquid portion; such as oil.

Preferably, the magnetic clutch device further comprises:

an unsynchronised state, where the magnetic particulate material and the liquid portion are arranged randomly in the mixture; and a synchronised state, where the magnetic particulate material and the liquid portion are magnetically aligned in the mixture.

In an example embodiment, the each of first and second magnets is a permanent magnet, or, an electromagnet.

In a further broad form, the present invention relates to a fluid filled flywheel adapted to be rotated about a rotation axis, the flywheel having a substantially curved-shaped body, including:

an upper region, having a first radius;

a lower region, having a second radius which is smaller than said first radius; and a fluid material within said body, such that, upon rotation of said flywheel, said fluid material is adapted to move between:

a stationary state, in which the flywheel is not rotating and the fluid is located substantially in the lower region;

a transitory state, in which the flywheel begins rotating and the fluid is located intermediate the lower and upper regions; and, a rotating state, in which the flywheel is rotating and the fluid is located substantially in the upper region.

Preferably, the flywheel is substantially neiloid shape, inverse parabolic shape, or, other curved shape.

Preferably, the fluid material includes any one or combination of:

small solid particulate material, such as sand;

semi solids; and thin or thick fluids, such as water, oil or mercury.

Preferably, the fluid filled flywheel is fitted to a rotatable shaft, which is rotated by a drive mechanism.

Preferably, the drive mechanism includes a motor, generator, wind turbine, a magnetic coupling device, or any other drive mechanism.

Preferably, the magnetic coupling device comprises:

one or more magnetic means that are adapted to rotate from the rotation of one or more primary magnetic means fitted to a rotating primary drive shaft.

Preferably, the fluid filled flywheel is energy harvesting device.

Preferably, the energy harvesting device includes any one or combination of:

an electric coil apparatus, via which an electric current is induced to flow when said apparatus is rotated; and a secondary rotatable shaft which is rotated via repulsion or attraction of magnets embedded in the flywheel.

Preferably, the weight fluid of the fluid filled flywheel is adjustable by pumping and suctioning the weight fluid from top or bottom of the fluid filled flywheel.

In a further broad form, the present invention relates to a system for torque amplification, power generation, transmission and/or storage, the system including a rotatable shaft, which is adapted to rotate, and which is substantially vertically disposed, the system including any one or combination of;

a pair of magnetic bearings, adapted to align the rotatable shaft in a substantially vertical position, the pair of magnetic bearings including:

an upper magnetic bearing; and a lower magnetic bearing adapted to cooperate with the upper magnetic bearing so as to exert a repelling force to the upper magnetic bearing and thereby levitate at least a portion of said rotatable shaft;

a magnetic clutch device adapted to induce rotation of a second shaft from the rotation of the rotatable shaft, the magnetic clutch device comprising:

a first interface, adapted to connect the magnetic clutch device to an end the rotatable shaft, the end of the rotatable shaft being embedded with a first magnet magnetically; and a second interface, to adapted to connect the magnetic clutch device to an end of the second shaft, the end of the second shaft being embedded with a second magnet; and a fluid filled flywheel fitted on the rotatable shaft, positioned substantially above the pair of magnets, the flywheel having a substantially curved-shaped body, including:

an upper region, having a first radius;

a lower region, having a second radius which is smaller than said first radius; and a fluid material within said body, such that, upon rotation of said flywheel, said fluid material is adapted to move between:

a stationary state, in which the flywheel is not rotating and the fluid is located substantially in the lower region;

a transitory state, in which the flywheel begins rotating and the fluid is located intermediate the lower and upper regions; and, a rotating state, in which the flywheel is rotating and the fluid is located substantially in the upper region.

In a further broad form, the present invention relates to a system for torque amplification, power generation, transmission and/or storage, the system including a rotatable shaft, which is adapted to rotate, and which is substantially vertically disposed, the system including:

a rotatable mass fitted on the rotatable shaft, the rotatable mass being flywheels embedded with permanent magnets and/or electromagnets;

one or more secondary rotatable shafts; and one or more secondary rotatable masses fitted on the respective one or more secondary rotatable shafts, each of the one or more secondary rotatable masses being flywheels embedded with permanent magnets and/or electromagnets, wherein the rotatable mass causes rotation of the one or more secondary rotatable shafts via repulsion of permanent magnets and/or electromagnets embedded in the rotatable mass and the one or more secondary rotatable masses.

Preferably, the sun gear-shaped flywheel includes one or more first magnets protruding from, or located near or at, the outer periphery thereof.

Preferably, the planet gear-shaped flywheel includes one or more second magnets protruding from, or located near or at, the outer periphery thereof.

Preferably, the planetary ring gear-shaped flywheel includes one or more third magnets protruding from, or located near or at, the inner periphery thereof.

Preferably, each of the one or more first magnets, the one or more second magnet, the one or more third magnets are in the form of arrow-shaped prisms including one or more magnetic vertical surfaces.

Preferably, the magnetic vertical surfaces interact with one another to allow the planetary ring gear-shaped flywheel and the sun gear-shaped flywheel to cause rotation of the one or more planet gear-shaped flywheels, causing rotation of the first-stage secondary shaft.

Preferably, the planetary ring gear-shaped flywheel includes one or more fourth magnets protruding from, or located near or at, the outer periphery thereof.

Preferably, the one or more fourth magnets of the planetary ring gear-shaped flywheel interact with the one or more fourth magnets of another planetary ring gear-shaped flywheel, or interact with permanent magnets and/or electromagnets embedded in the rotatable mass, to cause rotation of the secondary rotatable shaft.

BRIEF DESCRIPTION OF THE SEVERAL VIEWS OF THE DRAWINGS

Embodiments of the present invention will be described in further detail with reference to the drawings from which further features, embodiments and advantages may be taken, and in which:

FIG. 9 is a top view of the top portion of the apparatus of FIG. 8, showing an example embodiment of the shaping and arrangement of the magnets of the primary and first-stage secondary flywheels;

FIG. 10 shows a perspective view of the primary and first-stage secondary flywheels of FIG. 9;

FIG. 11 is a top view of the top portion of the apparatus of FIG. 8, showing a further example embodiment of the shaping and arrangement of the magnets of the primary and first-stage secondary flywheels;

FIG. 12 shows a perspective view of the primary and first-stage secondary flywheels of FIG. 11;

DESCRIPTION OF SPECIFIC EMBODIMENTS OF THE INVENTION

Throughout the drawings, like numerals will be used to identify like features, except where expressly otherwise indicated.

Figure 1:
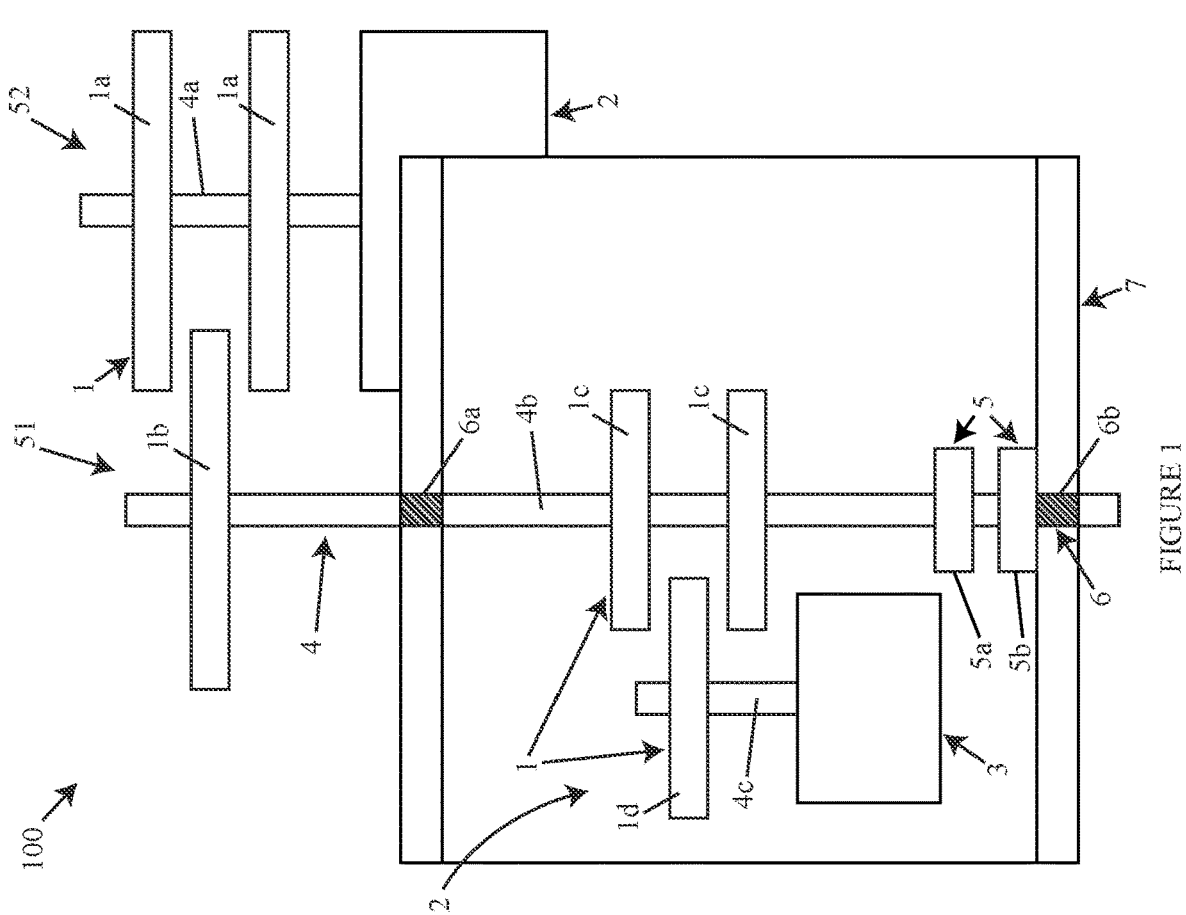
FIG. 1 is a side view of an embodiment of the present invention, showing an apparatus and system for storing, amplifying and using the energy generated with a motor.

In FIG. 1, a first embodiment of the power storage and amplification apparatus (100) is shown, comprising three componentry sections (50, 51 and 52). The first componentry section (50), comprises a motor or any other drive mechanism (2), a primary drive shaft (4a), and at least one primary magnetic gear (1a). The motor (2) is connected and rotates the primary drive shaft (4a). The primary magnetic gears (1a) are fitted to the primary drive shaft (4a), and rotate when the primary drive shaft (4a) is rotating.

The second componentry section (51) comprises a first-stage secondary drive shaft (4b), and at least one first-stage secondary magnetic gear (1b), and may be embodied as heavy flywheels, the operation of which will be described hereinafter.

Two ring magnets (5a, 5b) and/or magnetic bearings (6a, 6b) may interconnect the shaft to the support/base structure (7). The bearings (6a, 6b) may be embedded inside the support/base structure (7) to receive and align the first-stage secondary drive shaft (4b) in a substantially upright position with minimal rotational friction, as shown in FIG. 1.

The first-stage secondary drive shaft (4b) is configured to harness energy from the primary drive shaft (4a), where the transfer of energy from the primary drive shaft (4a) to the first-stage secondary drive shaft (4b) is facilitated via magnetic interactions of the primary and first-stage secondary magnetic gears (1a, 1b). In other words, the first-stage secondary drive shaft (4b) is caused to rotate when the primary drive shaft (4a) is rotated via attracting and repelling force interactions of the primary magnetic gears (1a) and the first-stage secondary magnetic gear (1b).

The first-stage secondary drive shaft (4b) is also fitted with a top magnetic ring (5a) and a bottom magnetic ring (5b), in which the magnetic rings (5a, 5b) are typically positioned at the lower half of the first-stage secondary drive shaft (4b), but may also be positioned at the upper half of the first-stage secondary drive shaft (4b). More specifically, the lower magnetic ring (5b) is positioned above and adjacent the lower bearing (6b) and support/base structure (7), and being 20) oppositely polarised to the upper magnetic ring (5a), so that the upper magnetic ring (5a) is repelled away from the lower magnetic ring (5b) and levitates along the first-stage secondary drive shaft (4b). In this embodiment, the upper magnetic ring (5a) also levitates the two additional secondary magnetic gears (1c), resulting in the additional secondary magnetic gears (1c) being substantially weightless with respect to the first-stage secondary drive shaft (4b). The rotation of the additional 25 secondary magnetic gears (1c), having reduced rotational energy and/or speed requirements, thus increases the rotational inertia and energy storage of the first-stage secondary drive shaft (4b).

In an example embodiment wherein the additional secondary magnetic gears (1c) are heavy flywheels, the heavy flywheels can use the rotational inertia to drive generators, or any other devices, immediately or in the future, with the energy stored in the heavy flywheels. Whilst FIG. 30 1 shows that the heavy flywheels are connected to the first-stage secondary drive shaft (4b), the heavy flywheels may also be connected adjacent to the first-stage secondary drive shaft (4b).

The third componentry section (52) of the apparatus (100) comprises a second-stage secondary drive shaft (4c), a (or any number of) second-stage secondary magnetic gear (1d), and an alternator/generator/battery/appliance (3). Similarly, the second-stage secondary drive shaft 35 (4c) is configured to harvest energy from the first-stage secondary drive shaft (4b), where the transfer of energy from the first-stage secondary drive shaft (4b) to the second-stage secondary drive shaft (4c) is facilitated via magnetic interactions of the two additional secondary magnetic gears (1c) and the second-stage secondary magnetic gear (1d). In other words, the second-stage secondary drive shaft (4c) is caused to rotate when the first-stage secondary drive shaft (4b) is rotated via attracting and repelling force interactions of the two additional secondary magnetic gears (1c) and the second-stage secondary magnetic gear (1d).

The rotational energy of the second-stage secondary drive shaft (4c) may then be used to drive the alternator/generator (3) and generate power with the energy.

Figure 2:
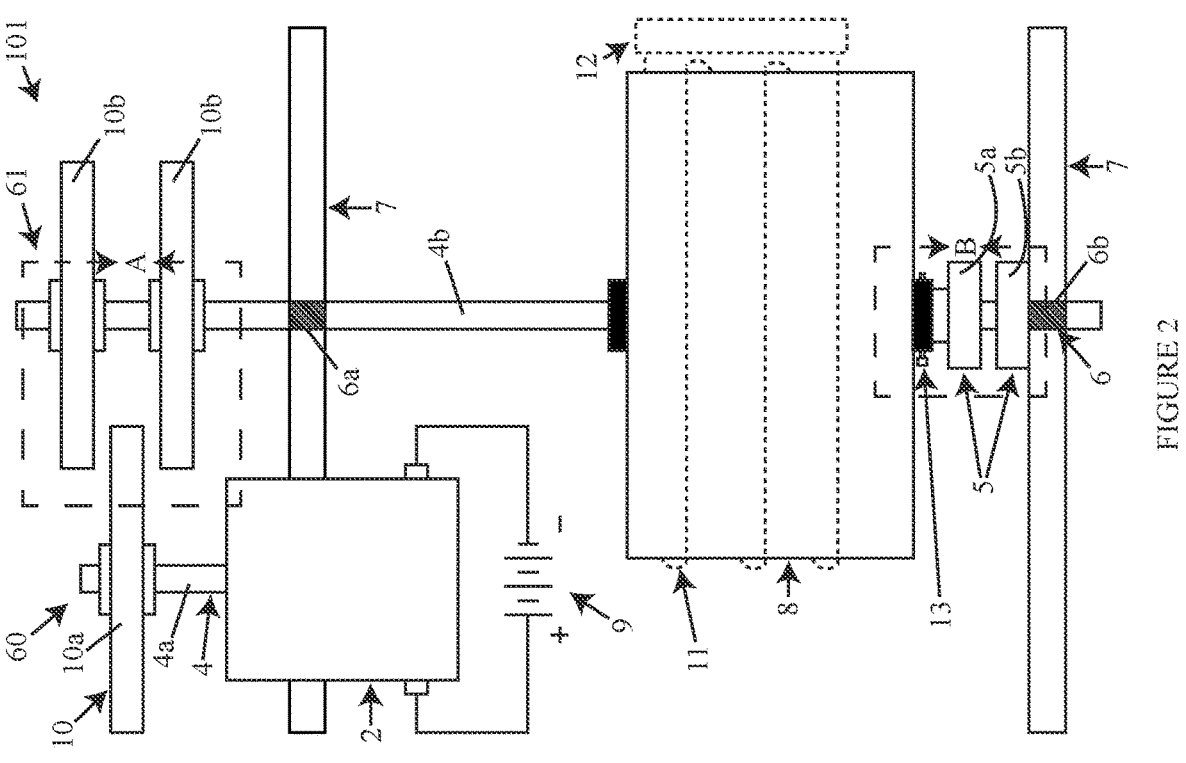
FIG. 2 is a side view of a further embodiment of the present invention, showing an apparatus and system for storing and amplifying the energy generated with a motor.

In FIG. 2, a second embodiment of the power storage and amplification apparatus (101) is shown, comprising two componentry sections (60 and 61) and a further optional componentry section (62). The first componentry section (60) comprises a motor or any other energy or drive force (2), a voltage source (9), a primary drive shaft (4a), and a (or any number of) primary flywheel (10a). The motor (2) is connected to the primary drive shaft (4a), rotating the primary drive shaft (4a) when the motor (2) is operating. The primary flywheel (10a) is fitted to the primary drive shaft (4a), and rotates when the primary drive shaft (4a) is rotating.

The second componentry section (61) of the apparatus (101) comprises a first-stage secondary drive shaft (4b), two (or any number of) first-stage secondary flywheels (10b), an (or any number of) additional rotatable mass (8), two ring magnets (5a, 5b), a support/base structure (7), and two bearings (6a, 6b). The bearings (6a, 6b) are embedded inside the support/base structure (7) and adapted to receive and align the secondary drive shaft (4b) to a substantially upright position with minimal rotational friction, as shown in FIG. 2. Alternatively, the lower bearing (6b), and two ring magnets (5a, 5b) may be replaced by magnetic bearings (22), as shown in FIGS. 13 to 16, and as will be described hereinafter.

The first-stage secondary drive shaft (4b) is configured to harness energy from the primary drive shaft (4a), where the transfer of energy from the primary drive shaft (4a) to the first-stage secondary drive shaft (4b) is facilitated via magnetic interactions of the primary and first-stage secondary flywheels (10a, 10b). In other words, the first-stage secondary drive shaft (4b) is caused to rotate when the primary drive shaft (4a) is rotated via attracting and repelling force interactions of the primary flywheel (10a) and the first-stage secondary flywheels (1b).

Figure 3:
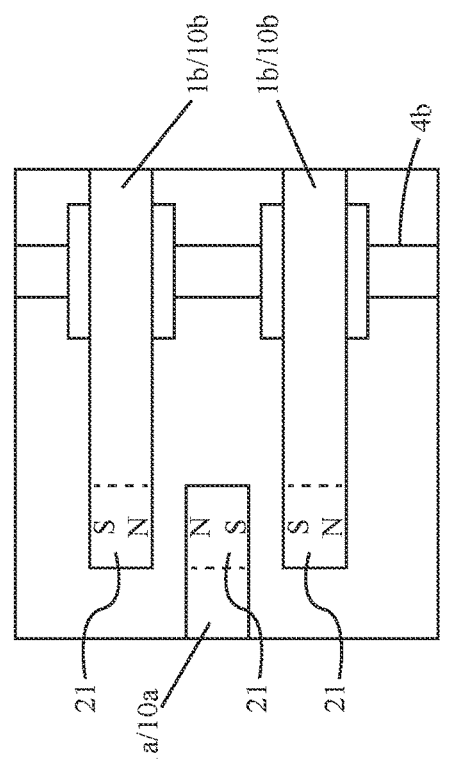
FIG. 3 shows a close-up view of section A of the apparatus of FIG. 2.

In FIG. 3, magnets (21) are embedded in the primary and first-stage secondary flywheels (10a, 10b). As shown, the magnets (21) of the primary flywheel (10a) are positioned oppositely to the magnets (21) of the first-stage secondary flywheels (10b) i.e. the south pole of the primary flywheel (10a) magnet (21) is adjacent to the south pole of the lower first-stage secondary flywheel (10b) magnet (21) while the north pole of the primary flywheel (10a) (21) is adjacent to the north pole of the upper first-stage secondary flywheel (10b) magnet (21). The magnets (21) can be either in the form of permanent magnets and/or electromagnets.

Although FIG. 3 shows the magnetic configuration of the primary and first-stage secondary flywheels (10a, 10b), it should be apparent to a skilled person that the configuration is not limited to flywheels and can also be incorporated into other types of magnetic gears (la, 1b).

Figure 5:
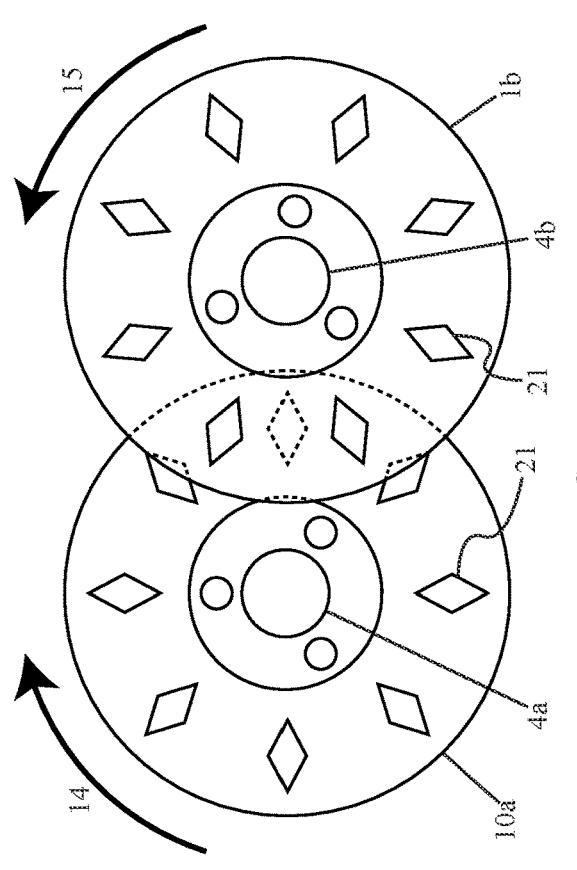
FIG. 5 is a top view of the top portion of the apparatus of FIG. 3, showing an example embodiment of the shaping and arrangement of the magnets of the primary and first-stage secondary flywheels.
Figure 6:
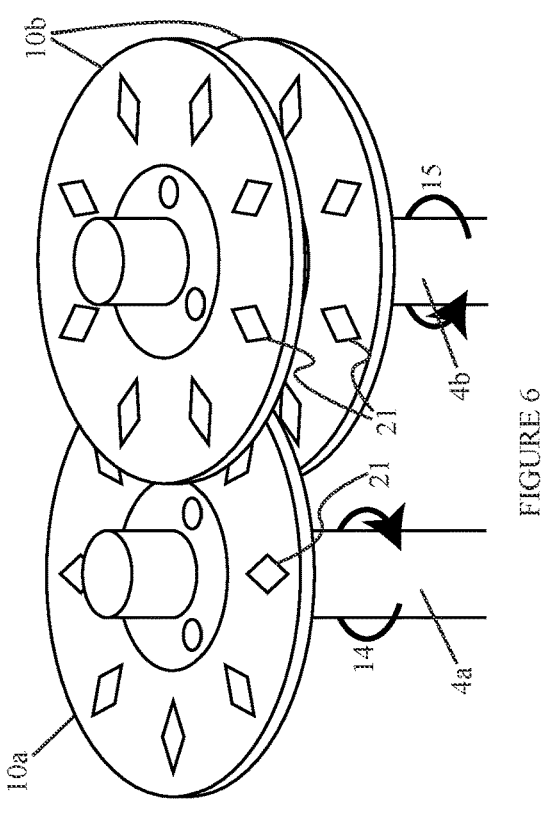
FIG. 6 shows a perspective view of the primary and first-stage secondary flywheels of FIG. 5.

FIGS. 5 and 6 further show an example embodiment of the primary and first-stage secondary flywheels (10a, 10b) having diamond shaped magnets (21). A skilled person would know, from viewing WO 2006/105617 A1, that various shapes and configurations are also possible for drive transfer, including oblong and circular shaped magnets.

As seen in FIGS. 5 and 6, when the primary drive shaft (4a) is rotated in a clockwise direction (14), the magnets (21) of the primary flywheel (10a) repel and attract the magnets (21) of the first-stage secondary flywheels (10b) to consequently rotate the first-stage secondary drive shaft (4b) in an anti-clockwise direction (15). Alternatively, a skilled person would understand that the opposite rotation would also apply with the primary drive shaft (4a) rotating in an anti-clockwise direction (14) and first-stage secondary drive shaft (4b) rotating in a clockwise direction (15).

Figure 4:
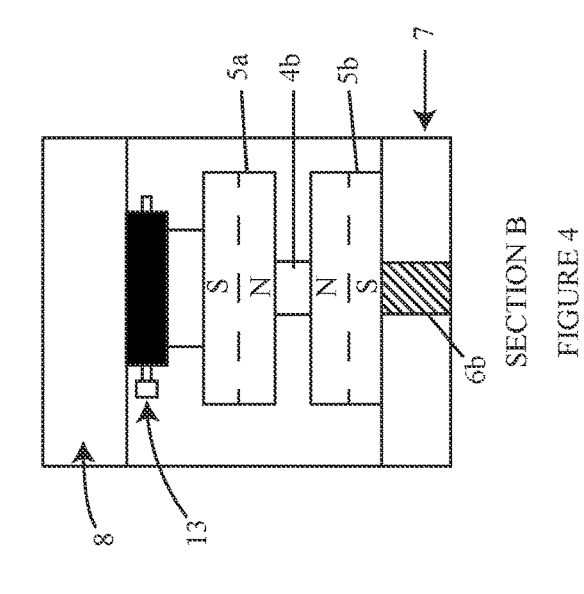
FIG. 4 shows a close-up view of section B of the apparatus of FIG. 2.

Referring back to FIG. 2, the first-stage secondary drive shaft (4b) may also be fitted with a top magnetic ring (5a) and a bottom magnetic ring (5b), in which the magnetic rings (5a, 5b) are typically positioned at the lower half of the first-stage secondary drive shaft (4b), but may alternatively or additionally be positioned at the upper half of the first-stage secondary drive shaft (4b). More specifically, the lower magnetic ring (5b) is positioned above and adjacent the lower bearing (6b) and support/base structure (7), and being oppositely polarised to the upper magnetic ring (5a), so that the upper magnetic ring (5a) is repelled away from the lower magnetic ring (5b) and levitates along the first-stage secondary drive shaft (4b), as can be seen in FIG. 4. In this embodiment, the upper magnetic ring (5a) also levitates the additional rotatable mass (8) (which may include the other machine component), resulting in the additional rotatable mass (8) being weightless with respect to the first-stage secondary drive shaft (4b). The rotation of the additional rotatable mass (8), having reduced rotational energy and/or speed requirements, thus increases the rotational inertia and energy storage of the first-stage secondary drive shaft (4b).

In an example embodiment wherein the additional rotatable mass (8) is one or more heavy flywheels, the heavy flywheels can use rotational inertia to drive generators, or any other devices, immediately or in the future with the energy stored in the heavy flywheels. Whilst FIG. 2 shows that the flywheels are connected to the first-stage secondary drive shaft (4b), the flywheels may also be connected adjacent to the first-stage secondary drive shaft (4b).

The further optional componentry section (62) of the apparatus (101), shown in the dotted lines of FIG. 2, comprises a coil (11) and an energy storage device (12). The coil (11) is wound around the additional rotatable mass (8) of the first-stage secondary drive shaft (4b), such that when the additional rotatable mass (8), having a magnetic field, is rotating, a current is induced in the coil (11). The induced electric current may then be stored in the energy storage device (12), which is electrically connected to the coil (11).

Figure 7:
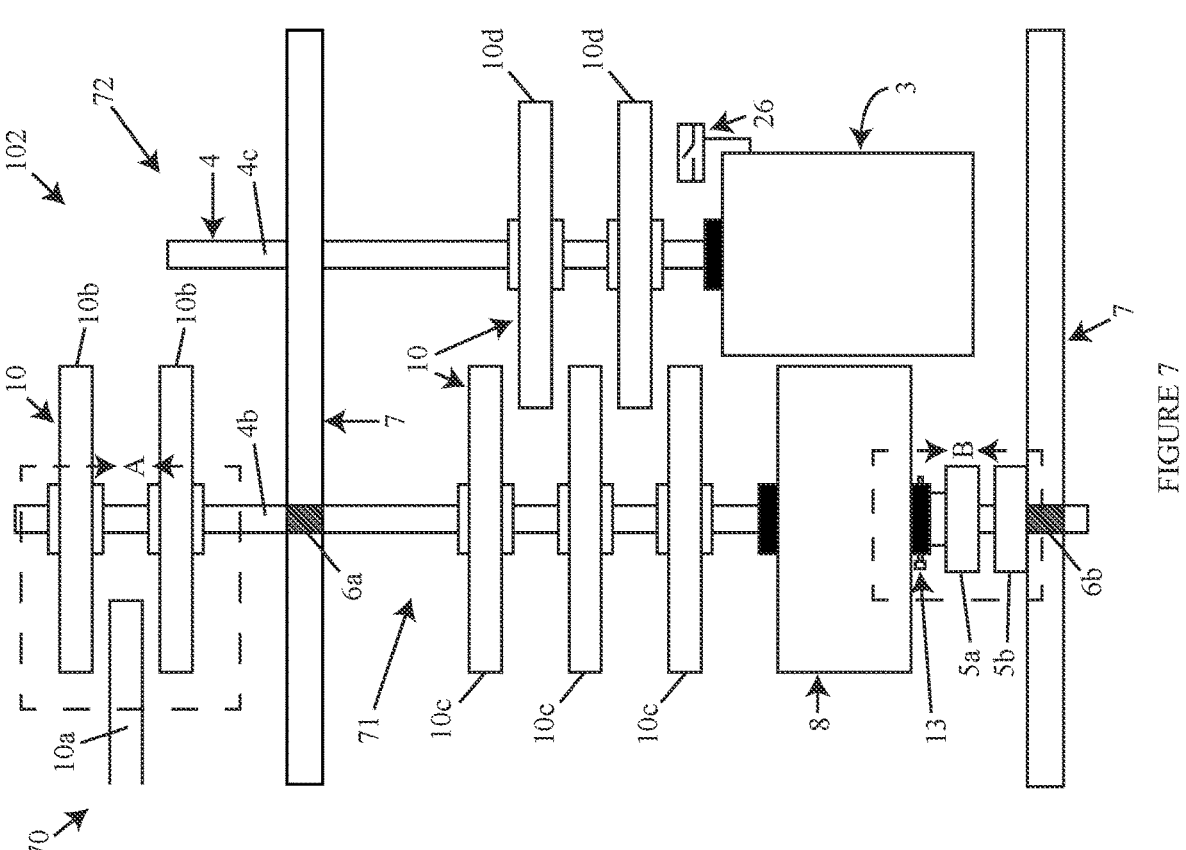
FIG. 7 shows a further embodiment of the present invention, showing an apparatus and system for storing, amplifying and using the energy generated with the motor of FIG. 3.
Figures 13, 14, 15, 16:
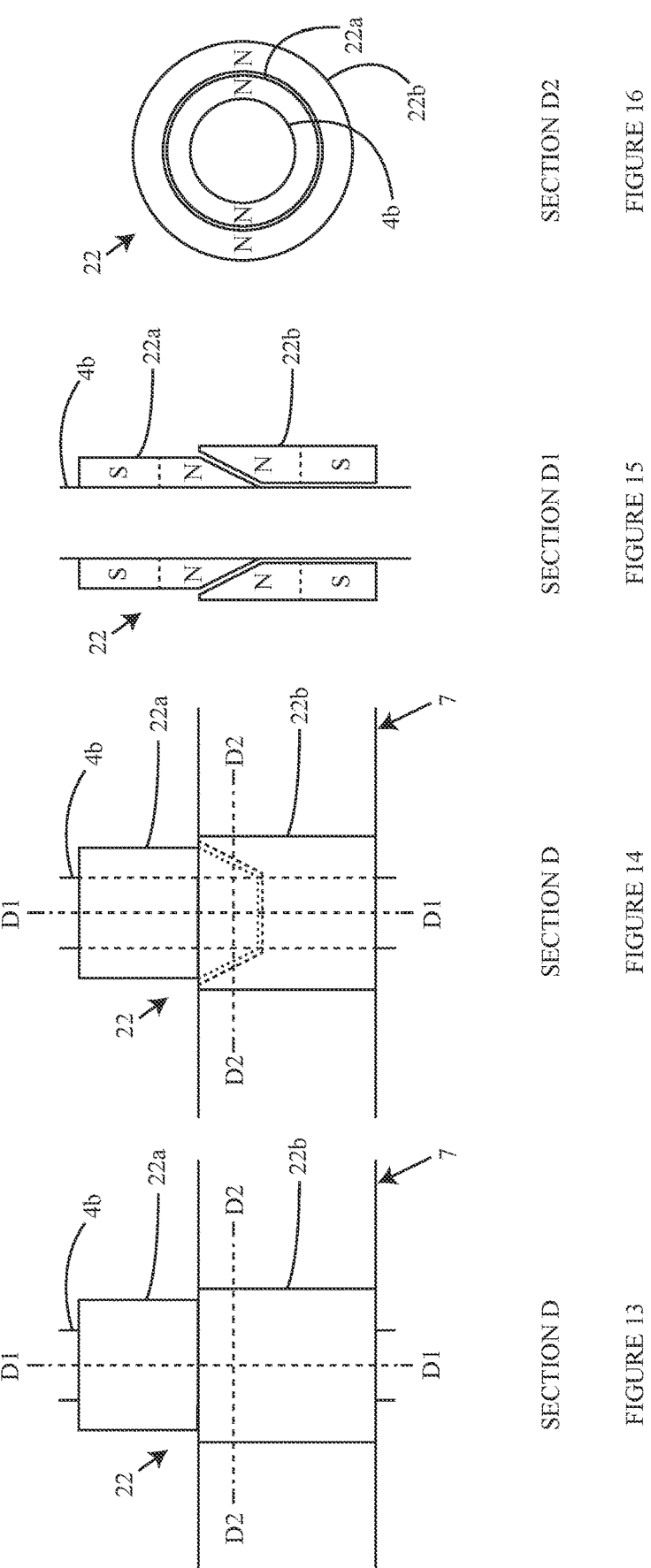
FIG. 13 shows a side view of a further embodiment of the present invention, showing an apparatus, more specifically a magnetic bearing device, for levitating a shaft of a machine.
FIG. 14 shows a side view of the apparatus of FIG. 13, in ghost form.
FIG. 15 shows a section view of section D1 of the apparatus of FIG. 13.
FIG. 16 shows a section view of section D2 of the apparatus of FIG. 13.

In FIG. 7, a third embodiment of the power storage and amplification apparatus (102) is shown, comprising three componentry sections (70, 71 and 72). The first componentry section (70), not entirely shown on FIG. 7, comprises a motor or any other energy or drive force (2), a voltage source (9), a primary drive shaft (4a), and a (or any number of) primary flywheel (10a). The motor (2) is connected to the primary drive shaft (4a), rotating the primary drive shaft (4a) when the motor (2) is operating. The primary flywheel (10a) is fitted to the primary drive shaft (4a), and rotates when the primary drive shaft (4a) is rotating.

The second componentry section (71) of FIG. 7 comprises a (or any number of) first-stage secondary drive shaft (4b), two (or any number of) first-stage secondary flywheels (10b), three additional secondary flywheels (10c), an additional rotatable mass (8), two ring magnets (5a, 5b), a support/base structure (7), and two bearings (6a, 6b). The bearings (6a, 6b) are embedded inside the support/base structure (7) and adapted to receive and align the secondary drive shaft (4b) to a substantially upright position with minimal rotational friction, as shown in FIG. 7. Alternatively or additionally, the lower bearing (6b), and two ring magnets (5a, 5b) may be removed and/or replaced by magnetic bearings (22), as shown in FIGS. 13 to 16.

The first-stage secondary drive shaft (4b) is configured to harness energy from the primary drive shaft (4a), where the transfer of energy from the primary drive shaft (4a) to the first-stage secondary drive shaft (4b) is facilitated via magnetic interactions of the primary and first-stage secondary flywheels (10a, 10b). In other words, the first-stage secondary drive shaft (4b) is caused to rotate when the primary drive shaft (4a) is rotated via attracting and repelling force interactions of the primary flywheel (10a) and the first-stage secondary flywheels (1b), as can be seen in FIGS. 3, 5 and 6, and their descriptions as already discussed hereinabove.

The first-stage secondary drive shaft (4b) is also fitted with a top magnetic ring (5a) and a bottom magnetic ring (5b), in which the magnetic rings (5a, 5b) are typically positioned at the lower half of the first-stage secondary drive shaft (4b), but may also be positioned at the upper half of the first-stage secondary drive shaft (4*b*). More specifically, the lower magnetic ring (5*b*) is positioned above and adjacent the lower bearing (6*b*) and support/base structure (7), and is oppositely polarised to the upper magnetic ring (5*a*), so that the upper magnetic ring (5*a*) is repelled away from the lower magnetic ring (5*b*) and levitates along the first-stage secondary drive shaft (4*b*), as can be seen in FIG. 4. In this embodiment, the upper magnetic ring (5*a*) also levitates any machine componentry above it, including the additional rotatable mass (8), and the additional secondary flywheels (10*c*), resulting in the componentry including the additional rotatable mass (8) and the additional secondary flywheels (10*c*) all being weightless with respect to the first-stage secondary drive shaft (4*b*). The rotation of the additional rotatable mass (8) and additional secondary flywheels (10*c*), having reduced rotational energy and/or speed requirements, thus increases the rotational inertia and energy storage of the first-stage secondary drive shaft (4*b*).

In an example embodiment wherein the additional rotatable mass (8) and the additional secondary flywheels are all heavy flywheels, the heavy flywheels can use rotational inertia to drive generators, or any other devices, immediately or in the future with the energy stored in the heavy flywheels. Whilst FIG. 7 shows that the flywheels are connected to the first-stage secondary drive shaft (4*b*), the flywheels may also be connected adjacent to the first-stage secondary drive shaft (4*b*).

The third componentry section (72) of the apparatus (102), shown on the right side of FIG. 7, comprises a second-stage secondary drive shaft (4*c*), two (or any number of) second-stage secondary flywheels (10*d*), which may be used to power or drive an alternator/generator/battery/apparatus (3). Similarly, the second-stage secondary drive shaft (4*c*) may be configured to harvest energy from the first-stage secondary drive shaft (4*b*), where the transfer of energy from the first-stage secondary drive shaft (4*b*) to the second-stage secondary drive shaft (4*c*) is facilitated via magnetic interactions of the three additional secondary flywheels (10*c*) and the second-stage secondary flywheels (10*d*). In other words, the second-stage secondary drive shaft (4*c*) is caused to rotate when the first-stage secondary drive shaft (4*b*) is rotated via attracting and repelling force interactions of the three additional secondary flywheels (10*c*) and the two second-stage secondary flywheels (10*d*), by similar operation to that demonstrated in in FIGS. 3, 5 and 6, and their descriptions as already discussed hereinabove.

The rotational energy of the second-stage secondary drive shaft (4*c*) may then be used to drive the alternator, generator and/or other machinery (3) or store power generated in a battery. A switch (26) may optionally be included to only use the rotational energy of the second-stage secondary drive shaft (4*c*) when it is needed.

Figure 8:
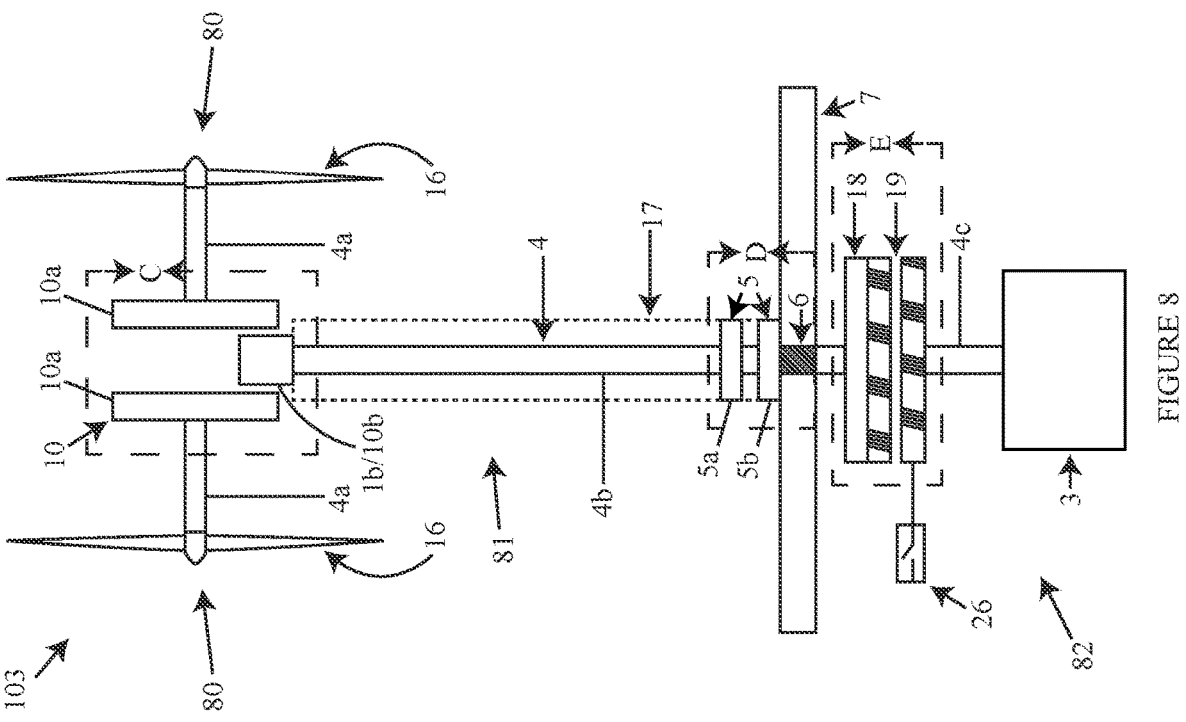
FIG. 8 is a side view of a further embodiment of the present invention, showing an apparatus and system for storing, amplifying and using the energy generated from two wind turbines.

In FIG. 8, a fourth embodiment of the power storage and amplification apparatus (104) is shown, comprising three componentry sections (80, 81 and 82). The first componentry section (80) of FIG. 8 comprises two (or any number of) wind turbines or any other energy or drive force (16), two primary drive shaft (4*a*), and two (or any number of) primary flywheels (10*a*). Each wind turbine (16) is connected to the respective primary drive shaft (4*a*) and rotates the respective primary drive shaft (4*a*) when the turbine (16) is turned via external wind. The primary flywheels (10*a*), fitted separately to the primary drive shafts (4*a*), each rotate when their respective primary drive shaft (4*a*) is rotating.

The primary drive shaft (4*a*) can also be mounted under the wind turbine (16), or housed underground under the wind turbine (16) or other drive means.

The second componentry section (81) of the apparatus (104) comprises a first-stage secondary drive shaft (4*b*), a (or any number of) first-stage secondary magnetic gear/flywheel (1*b*/10*b*), a magnetic coupling device (19), a flywheel (18), two ring magnets (5*a*, 5*b*), a housing (17), a support/base structure (7), and a bearing (6) embedded inside the support/base structure (7).

The first-stage secondary drive shaft (4*b*) may be configured to harness energy from the primary drive shafts (4*a*), where the transfer of energy from the primary drive shaft (4*a*) to the first-stage secondary drive shaft (4*b*) is facilitated via magnetic interactions of the primary flywheels (10*a*) and the first-stage secondary magnetic gear/flywheel (1*b*/10*b*). In other words, the first-stage secondary drive shaft (4*b*) is caused to rotate when the primary drive shaft (4*a*) is rotated via attracting and repelling force interactions of the primary flywheels (10*a*) and the first-stage secondary magnetic gear/flywheel (10*b*).

FIGS. 9 and 10 show an example embodiment of the magnetic interface section, herein referred to as section C, of the apparatus (103) of FIG. 8. In FIGS. 9 and 10, magnets (21) are embedded in the primary and first-stage secondary magnetic gears/flywheels (10*a*, 1*b*/10*b*). The magnets (21) can be either in the form of permanent magnets and/or electromagnets. An example embodiment of the primary and first-stage secondary magnetic gears/flywheels (10*a*, 1*b*/10*b*) is shown, having diamond shaped magnets (21). Furthermore, the first-stage secondary magnetic gear/flywheel (1*b*/10*b*) may be cylinder-shaped, with the magnets (21) positioned around the curved surface of the first-stage secondary magnetic gear/flywheel (1*b*/10*b*). A skilled person would know, from viewing WO 2006/105617 A1, that various shapes and configurations are also possible for drive transfer, including oblong and circular shaped magnets.

As seen in FIGS. 9 and 10, when the left primary drive shaft (4*a*) is rotated in a clockwise direction (20) and the right primary drive shaft (4*a*) is rotated in an anti-clockwise direction (20), the magnets (21) of the primary flywheels (10*a*) repel and attract the magnets (21) of the first-stage secondary magnetic gear/flywheel (1*b*/10*b*) to consequently rotate the first-stage secondary drive shaft (4*b*) in an anti-clockwise direction (15), but may rotate in the clockwise direction (15) depending on the positioning of the magnets (21). Assuming that the anti-clockwise direction (15) does occur for the first-stage secondary drive shaft (4*b*), a skilled person would also understand that the opposite rotation would apply with the left and right primary drive shafts (4*a*) rotating respectively in an anti-clockwise and clockwise directions (20) and the first-stage secondary drive shaft (4*b*) rotating in a clockwise direction (15).

FIGS. 11 and 12 show a further alternative example embodiment of section C. In FIGS. 11 and 12, each of the primary and first-stage secondary magnetic gears/flywheels (10*a*, 1*b*/10*b*) comprise a top portion (1*a*'/10*a*', 1*b*'/10*b*') and a bottom portion (1*a*"/10*a*", 1*b*"/10*b*"), with magnets (21) embedded in them. The magnets (21) can be either in the form of permanent magnets and/or electromagnets. An example embodiment of the primary and first-stage secondary magnetic gears/flywheels (10*a*, 1*b*/10*b*) is shown, having diamond shaped magnets (21). A skilled person would understand, from viewing WO 2006/105617 A1, that various shapes and configurations are also possible for drive transfer, including oblong and circular shaped magnets. The top portions (1*a*'/10*a*', 1*b*'/10*b*') of the primary and first-stage secondary magnetic gears/flywheels (1*a*/10*a*, 1*b*/10*b*) are conically shaped, with the magnets (21) positioned at raised/inclined positions in respect with their drive shafts (4*a*, 4*b*), while the bottom portions (1b"/10b") of the first-stage secondary magnetic gear/flywheel (1b/10b) is cylinder shaped.

As seen in FIGS. 11 and 12, when the left primary drive shaft (4a) is rotated in a clockwise direction (20) and the right primary drive shaft (4a) is rotated in an anti-clockwise direction (20), the magnets (21) of the primary flywheels (10a) repel and attract the magnets (21) of the first-stage secondary magnetic gear/flywheel (1b/10b), with the magnetic fields of the top portions (1a'/10a', 1b'/10b') and the bottom portions (1a"/10a", 1b"/10b") interacting separately, to consequently rotate the first-stage secondary drive shaft (4b) in an anti-clockwise direction (15), but, may alternatively rotate in the clockwise direction (15) depending on the positioning of the magnets (21). Assuming that the anti-clockwise direction (15) does occur for the first-stage secondary drive shaft (4b), a skilled person would also understand that the opposite rotation would apply with the left and right primary drive shafts (4a) rotating respectively in an anti-clockwise and clockwise directions (20) and the first-stage secondary drive shaft (4b) rotating in a clockwise direction (15).

Whilst FIGS. 11 and 12 shows the embodiment of the primary and first-stage secondary magnetic gears/flywheels (10a, 1b/10b) having conically-shaped top portions (1a'/10a', 1b'/10b') and flat or cylinder-shaped bottom portions (1a"/10a", 1b"/10b"), it should be apparent to a skilled person that the primary and first-stage secondary magnetic gears/flywheels (10a, 1b/10b) could also only be conically-shaped.

It should also be apparent to a skilled person that the magnetic interaction of section C could also function with the removal of the first-stage secondary magnetic gear/flywheel (1b/10b), and, that the magnets (21) are instead embedded in the first-stage secondary drive shaft (4b). A skilled person would also understand that the magnets (21) may be embedded in the wind turbine (16) instead of the primary magnetic gears/flywheels (1a/10a).

Returning back to FIG. 8, the first-stage secondary drive shaft (4b) may also be fitted with a top magnetic ring (5a) and a bottom magnetic ring (5b), in which the magnetic rings (5a, 5b) are typically positioned at the lower half of the first-stage secondary drive shaft (4b), but may also be positioned at the upper half of the first-stage secondary drive shaft (4b). More specifically, the lower magnetic ring (5b) may be positioned above and adjacent the bearing (6) and support/base structure (7), and is oppositely polarised to the upper magnetic ring (5a) so that the upper magnetic ring (5a) is repelled away from the lower magnetic ring (5b), and levitates along the first-stage secondary drive shaft (4b) and housing (17). In this embodiment, the upper magnetic ring (5a) also levitates the first-stage secondary magnetic gear/flywheel (1b/10b), resulting in the first-stage secondary magnetic gear/flywheel (1b/10b) and housing (17) being weightless with respect to the first-stage secondary drive shaft (4b). The rotation of the first-stage secondary magnetic gear/flywheel (1b/10b), being levitated by the repulsion of the pair of magnetic rings (5a, 5b), thus increases the rotational inertia and energy storage of the first-stage secondary drive shaft (4b).

In an alternative example embodiment, the magnetic rings (5a, 5b) and bearing/lower bearing (6, 6b), grouped as section D, may be used in addition to, or, replaced by, magnetic bearings (22) in seeking to make the rotation of the first-stage secondary drive shaft substantially frictionless.

As shown in FIGS. 13 to 16, the magnetic bearings (22) comprise a top portion magnet (22a) and a bottom portion magnet (22b). The bottom portion magnet (22a) of the magnetic bearings (22) is positioned inside the support/base/body structure (7) of a machine, and is oppositely positioned to the top portion (22a) of the magnetic bearings (22), i.e. the north pole of the bottom portion magnet (22b) is adjacent to the north pole of the top portion magnet (22a), and repels the top portion magnet (22a) away from the bottom portion magnet (22b). This levitates the drive shaft (4b). The top portion and lower portion magnets (22a, 22b) can be either in the form of permanent magnets and/or electromagnets.

In some example embodiments, it may be desired to tighten or loosen the magnetic bearings (22). An adjustment mechanism may therefore be provided to achieve this. For example, a threaded bar or thread on the shaft can be used to bring the magnetic bearing components together or loosen them, by tightening or loosening bolts provided on one or both side of the threaded bar/shaft.

Whilst the first-stage secondary drive shaft (4b) has been illustrated to be used with the magnetic bearings (22), it should be apparent to a skilled person that other shafts (4) may also be used with magnetic bearings (22). In alternative example embodiments, the bottom portion magnet (22b) is not fitted on the shaft (4), and/or the shaping of the top portion magnet (22b) may be convex, conical or like curved shaped, with the bottom portion magnet (22a) being of complementary shape, such as concave, hemispherical cavity, conical cavity or other complementary curved shape, to ensure compatibility and substantial vertical alignment of the shaft (4).

Referring back to FIG. 8, the third componentry section (82) of the apparatus (100), shown on the bottom side of FIG. 8, comprises a second-stage secondary drive shaft (4c), a magnetic coupling device (19), and an alternator/generator (3). Similarly, the second-stage secondary drive shaft (4c) is configured to harvest energy from the first-stage secondary drive shaft (4b), where the transfer of energy from the first-stage secondary drive shaft (4b) to the second-stage secondary drive shaft (4c) is facilitated via the magnetic coupling devices (19) of the second and third componentry sections. This means that the second-stage secondary drive shaft (4c) is caused to rotate when the first-stage secondary drive shaft (4b) is rotated via attracting and repelling force interactions of the magnetic coupling devices (19) connected to the first-stage and second-stage secondary drive shafts two additional secondary magnetic gears (1c). The coupling device (19) may also optionally be connected a switch (26) to only transfer the energy from the first-stage secondary drive shaft (4b) to the second-stage secondary drive shaft (4c) when it is required.

Whilst the fourth embodiment discloses a flywheel (18) and housing (4) in the second componentry section, it will be evident to a skilled person that the second-stage secondary drive shaft (4c) may be directly connected to the magnetic coupling device (19), without the flywheel (18), and that the housing could be replaced by an additional rotatable mass (8) and/or one or more additional first-stage secondary flywheels/magnetic gears (10c/1c), as shown in the second and third embodiments of the invention, which also can induce and/or transfer rotational energy to a second-stage drive shaft (4c).

Figures 17, 18, 19, 20, 21:
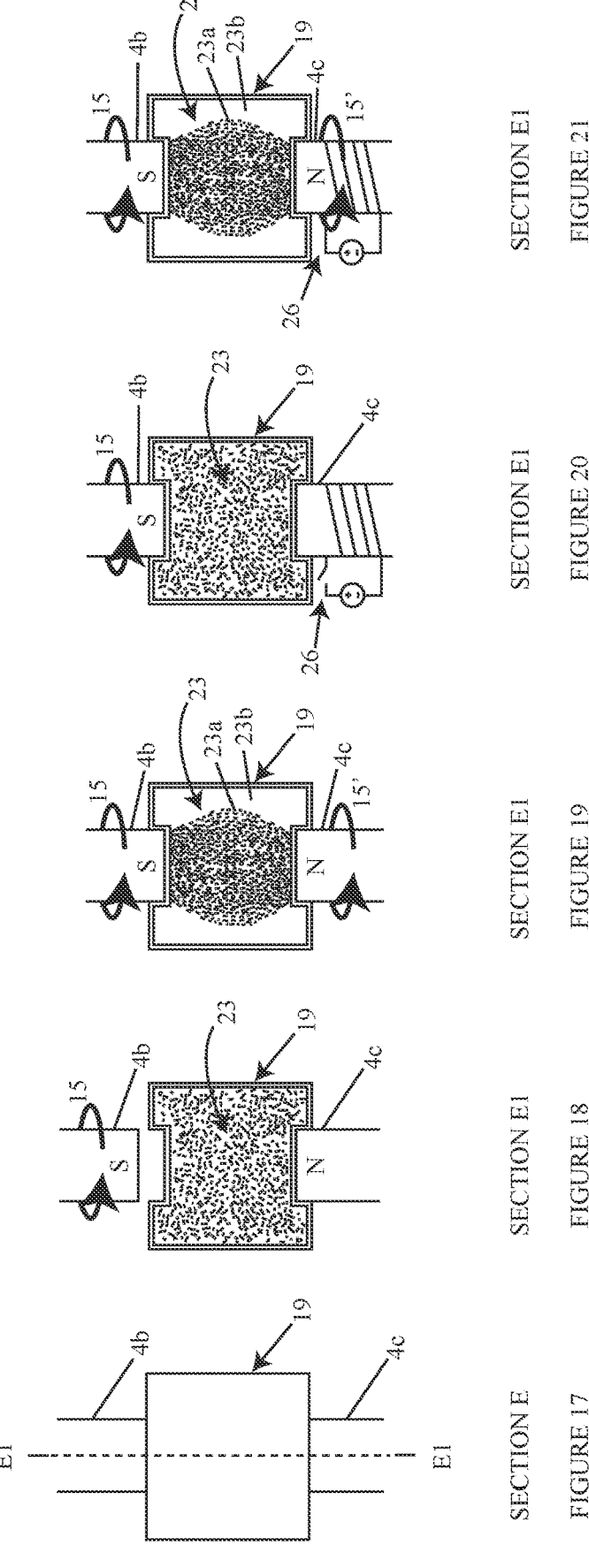
FIG. 17 shows a side view of a further embodiment of the present invention, showing an apparatus, more specifically a magnetic coupling and magnetic clutch device, for inducing rotation from a first shaft to a second shaft.
FIG. 18 shows a side view of a first position of section E1 of an example embodiment of the apparatus of FIG. 17, wherein the first shaft is positioned away from the apparatus.
FIG. 19 shows a side view of a second position of section E1 of an example embodiment of the apparatus of FIG. 17, wherein the first shaft is positioned in contact with the apparatus.
FIG. 20 shows a side view of a first position of section E1 of a further example embodiment of the apparatus of FIG. 17, wherein the first shaft is positioned in contact with the apparatus and the second shaft is de-energised.
FIG. 21 shows a side view of a second position of section E1 of a further example embodiment of the apparatus of FIG. 17, wherein the first shaft is positioned in contact with the apparatus and the second shaft is energised.

In an alternative embodiment, the flywheel (18) and magnetic coupling device (19), grouped as section E, could also be used in addition to or alternatively to the magnetic coupling and magnetic clutch device (19), as shown in FIGS. 17 to 21. As shown in the section view E1, the magnetic coupling and clutch device (19) comprises a mixture (23) of iron filings or any other magnetic particulate material (23*a*), and liquid portion (23*b*), which may be oil or other similar fluids. In FIGS. 18 and 19, an example form of the magnetic coupling and magnetic clutch device (19) is shown, comprising two permanent magnets that are attached to respective ends of the first-stage secondary drive shaft (4*b*) and the second-stage secondary drive shaft (4*c*).

In FIG. 18, a first position is shown where the first-stage secondary drive shaft (4*b*) is rotating in a direction (15) but positioned away from the magnetic coupling and magnetic clutch device (19), while the second-stage secondary drive shaft (4*c*) is stationary and in contact with the magnetic coupling and magnetic clutch device (19). When the magnetic coupling and magnetic clutch device (19) is brought in contact with the rotating first-stage secondary drive shaft (4*b*), the iron filings (23*a*) begin to move, under the effect of the magnet, into an orderly position within the mixture (23), towards the centre of the magnetic coupling and magnetic clutch device (19) within the liquid portion (23*b*), as shown in the second position of FIG. 19. The iron filings (23*a*) strengthen the magnetic field and thus cause the second-stage secondary drive shaft (4*c*) to rotate in the same direction (15') as the first-stage secondary drive shaft (4*b*). As the iron filings (23*a*) slowly transition to the final form, the magnetic coupling and magnetic clutch device (19) provides a soft start for the second-stage secondary drive shaft (4*c*).

In FIGS. 20 and 21, an example form of the magnetic coupling and magnetic clutch device (19) is shown, comprising a permanent magnet, attached to a respective end of the first-stage secondary drive shaft (4*b*), and an electromagnet, attached to a respective end of the second-stage secondary drive shaft (4*c*).

In FIG. 20, a first position is shown where the first-stage secondary drive shaft (4*b*) is rotating in a direction (15) and in contact with the magnetic coupling and magnetic clutch device (19), while the second-stage secondary drive shaft (4*c*), which is also in contact with the magnetic coupling and magnetic clutch device (19), is stationary since the electromagnet is not turned on. When the electromagnet of the second-stage secondary drive shaft (4*c*) is turned on, the iron filings (23*a*) begin to move into an orderly position within the mixture (23), towards the centre of the magnetic coupling and magnetic clutch device (19), while the liquid portion (23*b*) moves to the outer region of the magnetic coupling and magnetic clutch device (19), as shown in the second position of FIG. 21. In the final form, the iron filings (23*a*) connect together and causes the second-stage secondary drive shaft (4*c*) to rotate in the same direction (15') as the first-stage secondary drive shaft (4*b*). As the iron filings (23*a*) slowly transition to the final form, the magnetic coupling and magnetic clutch device (19) slowly strengthens and provides a soft start for the second-stage secondary drive shaft (4*c*). It should be apparent to a skilled person that all the different combinations of permanent magnets and/or electromagnets may be used with the magnetic coupling and magnetic clutch device (19).

Whilst the first-stage secondary drive shaft (4*b*) and second-stage secondary drive shaft (4*c*) has been used for the magnetic coupling and magnetic clutch device (19), it should be apparent to a skilled person that other shafts (4) may also be used for the magnetic coupling and magnetic clutch device (19).

Figure 22:
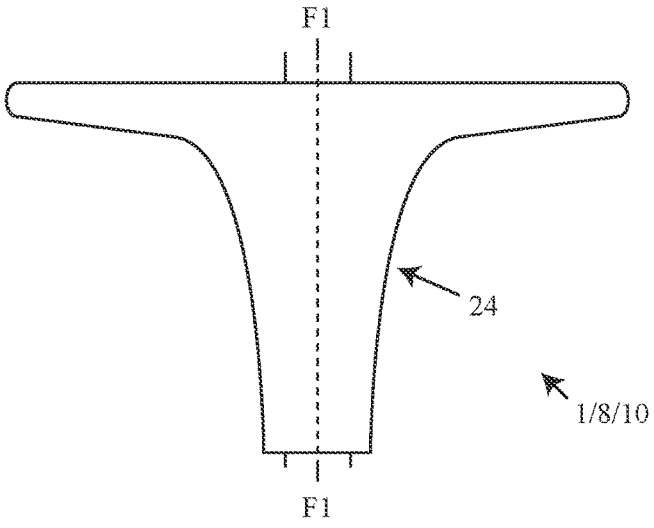
FIG. 22 shows a side view of a further embodiment of the present invention, showing a flywheel.
Figure 23:
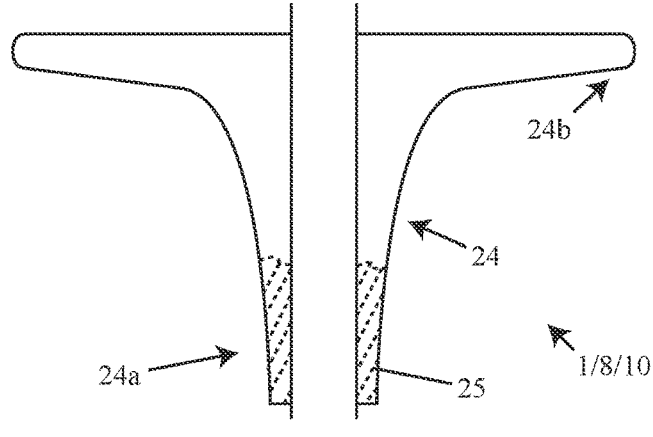
FIG. 23 shows a side view of a first position of the apparatus of FIG. 22, wherein the flywheel weight material is located at a first location of the apparatus when the shaft is stationary.
Figure 24:
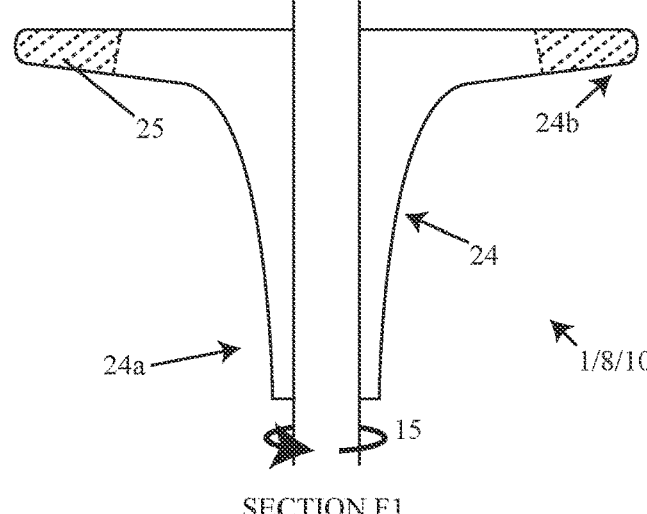
FIG. 24 shows a side view of a first position of the apparatus of FIG. 22, wherein the flywheel weight material is located at a second location of the apparatus when the shaft is rotating.

FIGS. 22 to 24 depicts a low moment of inertia start up flywheel, herein referred to as the alternate flywheel (24), designed to be used with any machine, including the machine (100, 101, 102, 103) of FIGS. 1, 2, 7 and 8. In FIG. 22, the alternate flywheel (24) is shown to be curved-shaped, for example neiloid-shaped or inverse parabolically shaped, having a bottom region (24*a*), where the radius is minimum, and a top region (24*b*), where the radius is maximum. The flywheel (24) contains a material (25), which may be made up of small solid particulate materials, semi solids and thick or thin fluids such as water, oil and/or mercury, such that it can move about within the casing of the flywheel.

In FIG. 23, a side view of section F1 is shown, where the flywheel weight material (25) is located at the bottom region (24*a*) of the alternate flywheel (24) when the first-stage secondary drive shaft (4*b*) is stationary. When the first-stage secondary drive shaft (4*b*) begins to rotate, the flywheel material (25) begins to move upwards toward the top region (24*b*) of the alternate flywheel (24), until it reaches the top region (24*b*) of the alternate flywheel (24), as shown in FIG. 24.

Before startup, the flywheel material (25) is positioned low within the flywheel casing, and close to the rotational axis/shaft. At startup, the flywheel has a low moment of inertia, and, gradually increases its inertia as the flywheel material (25) moves towards the top region (24*b*) and away from the first-stage secondary drive shaft (4*b*) or axis. A low centre of gravity is achieved during this process.

The flywheel material (25) can be adjusted by filling or emptying the flywheel (24) with the flywheel material (25). In one example, this may be achieved through the top or the bottom of the first-stage secondary drive shaft (4*b*). This allows a change in weight of the alternate flywheel (24) during its operation, by pumping and suctioning the flywheel material (25) from the alternate flywheel (24).

Whilst the first-stage secondary drive shaft (4*b*) has been used for the alternate flywheel (24), it should be apparent to a skilled person that other shafts (4) may also be used for alternate flywheel (24).

Although not shown, the present invention could also be housed in a vacuum containment to effectively/substantially eliminate air friction and prevent external forces from interfering with its intended operation. In further embodiments, the present invention could also be housed inside a Gyroscope. In further embodiments, the present invention could also be located underground to prevent any external forces from interfering with its intended operation.

In further embodiments, the primary drive shaft may also be powered by an electric pulse system instead of the motor. In further embodiments, a motor being used may also be able to be switched on and off in pulses to maintain speed of the flywheels/magnetic gears, if needed, or in short bursts.

In some embodiments, an apparatus may be used to harness unused energy of a primary shaft to a secondary shaft via magnetically-induced rotation, for amplifying the induced unused energy using magnetically-levitated flywheels or other rotational mass with force amplification, and for driving one or more generators or other machinery with the amplified induced unused energy via magnetically-induced rotation.

It will be appreciated that a machine produced in accordance with the present invention may incorporate a rotatable shaft which is adapted to rotate, and which is substantially vertically disposed, and which may include any one or combination of the following features as hereinbefore described, that is, a pair of magnetic bearings, a magnetic clutch device, and/or, a fluid filled flywheel.

It will be appreciated by skilled persons that the apparatus and system of first to fourth embodiments (100, 101, 102, 103) can be further modified to arrange the first and the primary and secondary stage flywheels to form a gear arrangement.

Figures 25, 26:
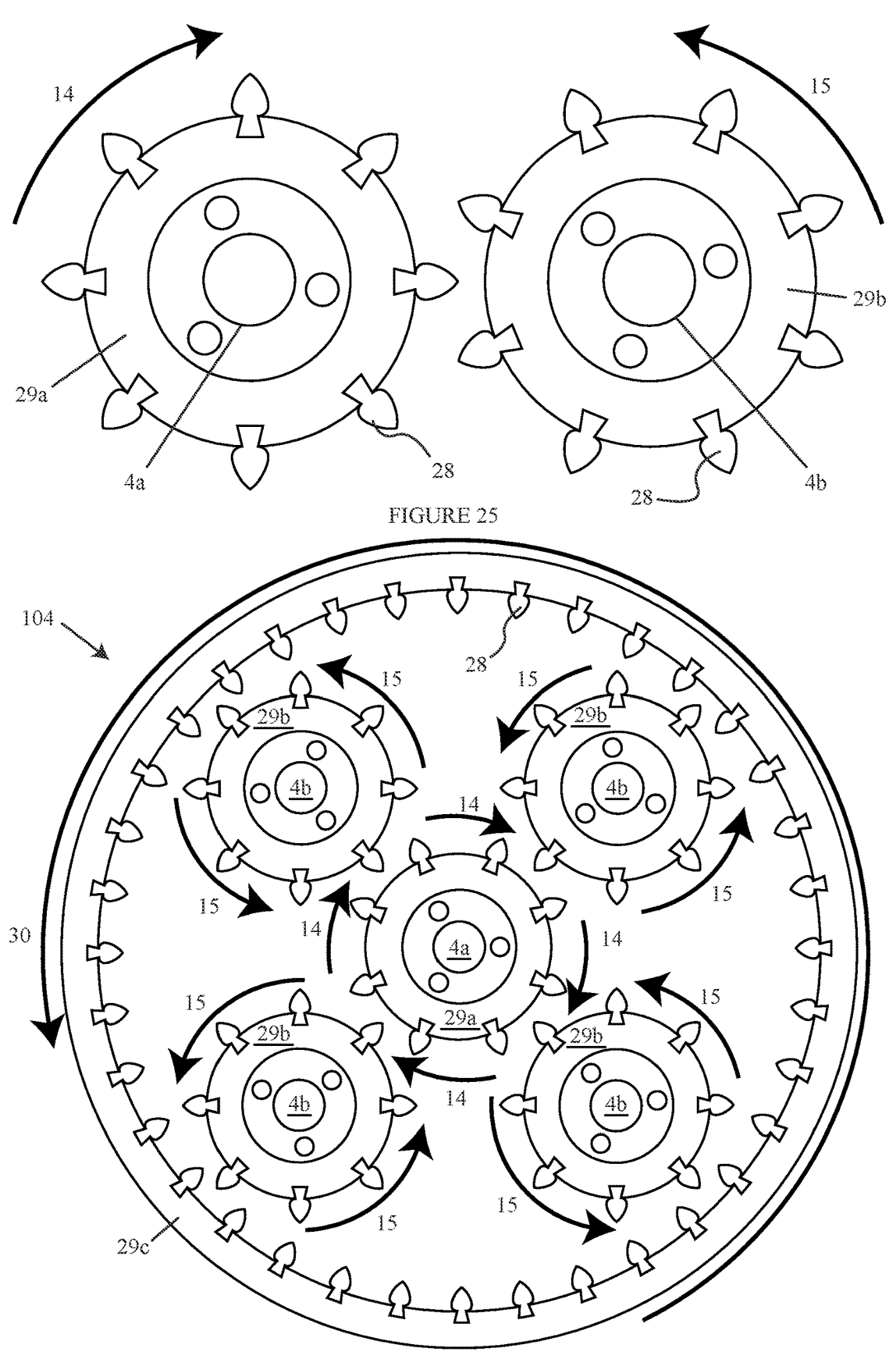
FIG. 25 is a top view of an example embodiment showing the shaping and arrangement of magnets of primary and first-stage secondary gear-shaped flywheels, which are modified version of the primary and first-stage secondary flywheels of FIGS. 5 and 6.
FIG. 26 shows a side view of a further embodiment of the present invention, showing an apparatus and system for storing, amplifying and using the energy generated with a motor, and further showing an example embodiment of the shaping and arrangement of the magnets of the primary and first-stage secondary gear-shaped flywheels of FIG. 25, and, the shaping and arrangement of the magnets of a primary planetary ring gear combined flywheel.

As shown in FIG. 25, the primary and first-stage secondary flywheels have been modified to become the primary and first-stage secondary gear-shaped flywheels (29a, 29b), each including one or more magnets (28) protruding out from the outer peripheral edges of the flywheels (29a, 29b). The magnets (28) may be arrow-shaped. Each magnet (28) may have the same magnetic polarity at its free end, so that when the primary drive shaft (4a) is rotated in a clockwise direction (14), the arrow-shaped magnets (28) of the primary gear-shaped flywheel (29a) repel the magnets (21) of the first-stage secondary gear-shaped flywheels (29b) to consequently rotate the first-stage secondary drive shaft (4b) in an anti-clockwise direction (15). An arrangement where the magnets (28) may attract, to resultingly cause stable rotation of the drive shafts (4a, 4b), could also be implemented to the flywheels (29a, 29b). Alternatively, a skilled person would appreciate that the opposite rotation would also apply with the primary drive shaft (4a) rotating in an anti-clockwise direction (14) and first-stage secondary drive shaft (4b) rotating in a clockwise direction (15). The 'arrow shaped' nature of the magnets may also assist in any contact or interaction of the magnets, so that movement is not hindered should a magnet contact an adjacent magnet. A plate or protective housing to stop magnets hitting in overload can also be used.

In addition, FIG. 26 shows a further embodiment of the system and apparatus for storing, amplifying the energy generated with a motor (3), with flywheels (29a, 29b, 29c) being arranged in a magnetic planetary gearbox arrangement. Similar to FIG. 25, the one or more arrow-shaped magnets (28) may protrude out from the outer peripheral edges of the primary and first-stage secondary gear-shaped flywheels (29a, 29b), which now respectively function as sun and planet gears, and have the same magnetic polarity at their free ends to repel each other to consequently cause the four first-stage secondary gear-shaped flywheels (29b) to rotate in an anti-clockwise direction (15) when the primary gear-shaped flywheel (29a) is rotated in a clockwise direction (14). There can be any number of planet gears.

In contrast, the primary planetary ring gear combined flywheel (29c) includes one or more magnets (28) protruding inwards from the inner peripheral edge. In an alternative embodiment, the one or more magnets (28) may protrude outwards from the primary planetary ring gear combined flywheel (29c). The magnets (28) may be arrow-shaped. The primary planetary ring gear combined flywheel (29c) is attached and levitated, via ring magnets (5a, 5b) of FIGS. 1 to 4 and 7 for example, or magnetic bearings (22) of FIGS. 13 to 16 for example, along the primary drive shaft (4a), but is configured to rotate in the reverse direction (30) when the primary drive shaft (4a) is rotating.

The primary planetary ring gear combined flywheel (29c) may also have the same magnetic polarity at the free ends of its one more magnets (28) to secure the first-stage secondary gear-shaped flywheels (29b), via repulsion, to the correct position so that it interacts with the primary gear-shaped flywheel (29a). An arrangement where the magnets (28) may attract, to resultingly cause stable rotation of the drive shafts (4a, 4b), could also be implemented to the flywheels (29a, 29b, 29c). The primary planetary ring gear combined flywheel (29c) is further adapted to facilitate inducing the first-stage secondary gear-shaped flywheels (29b) to rotate in the clockwise direction (15), by magnetic repulsion or attraction, when the primary planetary ring gear flywheel (29c) is rotating in the clockwise direction (30). Thus, increased speeds of the first-stage secondary drive shaft (4b)

can be realised from this magnetic planetary gearbox arrangement of the apparatus and system (104).

Figure 27:
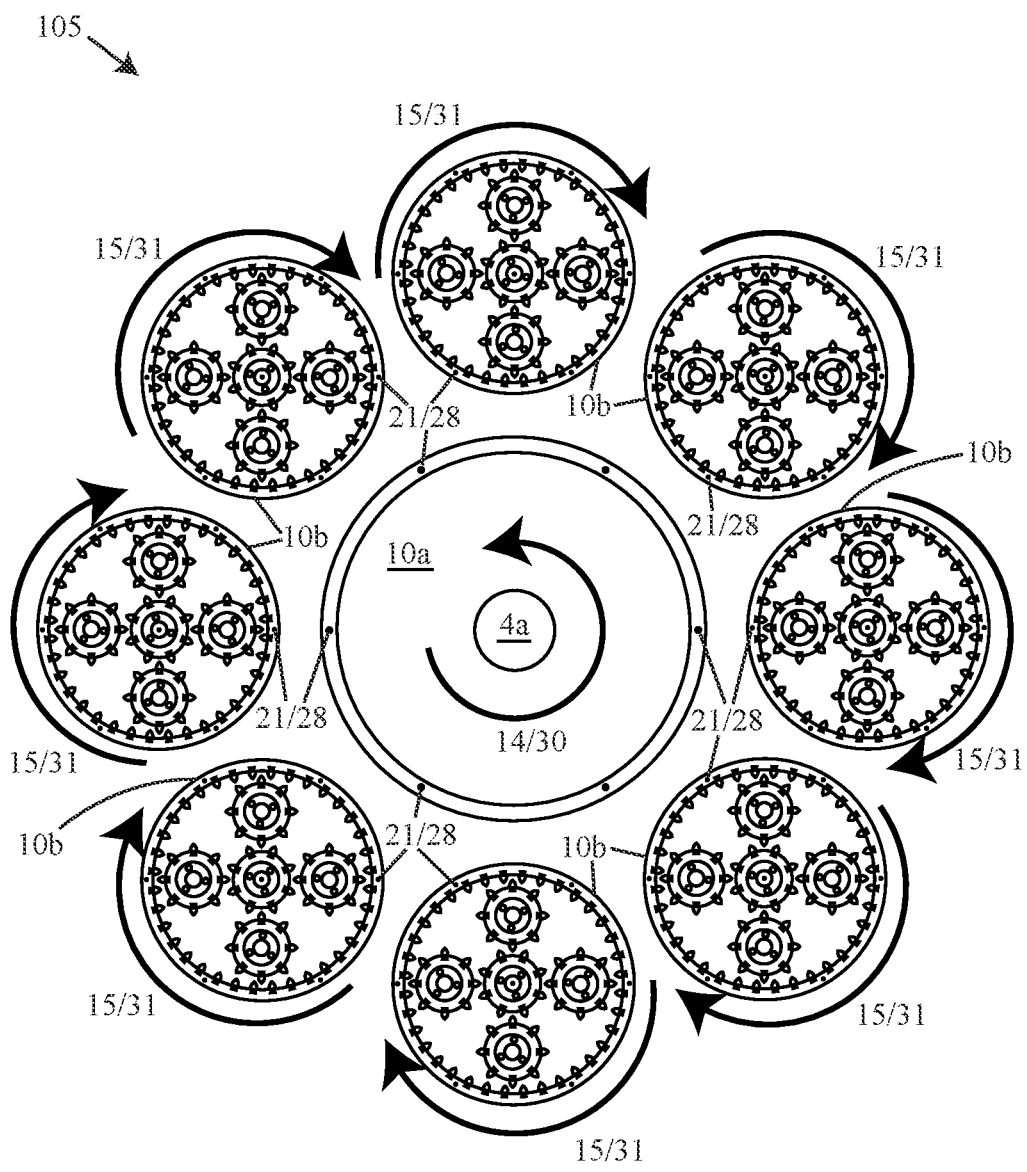
FIG. 27 is a top view of a further embodiment of the present invention, showing an apparatus and system for storing, amplifying and using the energy generated with a motor, wind turbine or hydroelectric generator, and showing the primary planetary ring gear combined flywheel of FIG. 26 being magnetically induced to rotate from the rotation of the primary drive shaft.

Whilst four first-stage secondary gear-shaped flywheels have been disclosed in FIGS. 26 and 27, it would be apparent to a skilled person that any number of first-stage secondary gear-shaped flywheels and primary gear-shaped flywheels, and also different interior shaping of the primary planetary ring gear combined flywheel.

Whilst the primary planetary ring gear combined flywheel is rotating in the reverse direction in this embodiment, persons skilled in the art will know that there would be other variations where the primary planetary ring gear combined flywheel rotates in the same direction as the primary gear-shaped flywheels, i.e. with the apparatus or system further comprising a second stage secondary gear-shaped flywheel between the first stage secondary gear-shaped flywheel and the primary planetary ring gear combined flywheel.

Alternatively, a skilled person would understand that the opposite rotation would also apply with the primary drive shaft (4a) rotating in an anti-clockwise direction (14) and first-stage secondary drive shaft (4b) rotating in a clockwise direction (15).

In other alternative example embodiments, the primary planetary ring gear combined flywheel (29c) can also be driven by magnetic means from the outside of the primary planetary ring gear combined flywheel, by repulsion or attraction, or with an electronic or other pulsing method. In alternative example embodiments, further planetary gearboxes may be added on to form a bigger gearbox, or an automatic gearbox or geartrain.

In particular, other embodiments of the invention may disclose the primary planetary ring gear combined flywheel (29c) to further include one or more magnets, protruding from the outer peripheral edge thereof. The planetary ring gear combined flywheel (29c) may transmit rotational energy to other planetary gearbox arrangements, which may be another planetary ring gear combined flywheel with or without planet and sun gears (which may be respectively similar to the first-stage secondary gear-shaped flywheels (29b) and the primary gear-shaped flywheel (29a)) located inside the another planetary ring gear combined flywheel, or to other drive shafts, or to additional ring gear combined flywheels that concentrically surround the ring gear combined flywheel (29c) and others of the additional ring gear combined flywheels, with some of the additional ring gear combined flywheels having planet and/or sun gears.

In other example embodiments, the primary planetary ring gear combined flywheel (29c), with or without the planetary gears, may also be the only flywheel with a small motor driving it from the outer rim. This results in the system being reduced in thickness, allowing it to be fitted in a suit case or under the floor of a car. Such a system would not have a flywheel, i.e., an additional rotatable mass (8), and that all its weight would be from the levitated primary planetary ring gear combined flywheel (29c), making the system very thin in size.

Whilst embodiments of FIGS. 26 and 27 have been described to be such that the primary planetary ring gear combined flywheel (29c) is levitated and the other sun gear and planet gear flywheels (29a, 29b) are fixed, it would be apparent to a skilled person that opposite is also possible with the primary planetary ring gear combined flywheel (29c) being fixed to the primary drive shaft (4a) and the other sun gear and planet gear flywheels (29a, 29b) levitated along their respective drive shafts (4a, 4b).

Further, the magnets (28) of FIGS. 25 to 28 could also be formed of other shapes to achieve the same purpose. In addition, the magnets could also be permanent or electromagnetic.

According to an alternative embodiment, the primary planetary ring gear combined flywheel (29*c*) may not be attached to primary drive shaft (4*a*), but levitated, via ring magnets (5*a*, 5*b*) of FIGS. 1 to 4 and 7 for example, or magnetic bearings (22) of FIGS. 13 to 16, for example, along the primary drive shaft (4*a*). In this example embodiment, the primary planetary ring gear combined flywheel (29*c*) is further adapted to rotate in a clockwise direction (30), by magnetic repulsion or attraction, when the first-stage secondary gear-shaped flywheels (29*b*) rotate in the clockwise direction (15).

FIG. 27 is a top view of a further embodiment of the present invention, showing an apparatus and system for storing, amplifying and using the energy generated with a motor, wind turbine or hydroelectric generator. The apparatus (105) includes a primary flywheel (10*a*) which is adapted to rotate with the rotation of the primary drive shaft (4*a*), which is rotated by the motor, wind turbine or hydroelectric generator. The primary flywheel (10*a*) includes one or more magnets (21) located near or at the outer peripheral edge of the primary flywheel (10*a*), in which the magnets (21) may be arrow-shaped magnets (28). In one form, the primary flywheel (10*a*) may include the entire system and apparatus (104) of FIGS. 26 and 27, with the magnets (21, 28) being located at the outer peripheral edge of the planetary ring gear combined flywheel (29*c*).

In addition, a plurality of ring gear combined flywheels, acting as first stage secondary flywheels (10*b*) may be positioned around the primary flywheel (10*a*). The first stage secondary flywheels (10*b*) each have magnets (21, 28) positioned near or at the outer peripheral edge of the first-stage secondary flywheels (10*b*), more specifically at the outer peripheral edge of the planetary ring gear combined flywheel located within each of the first-stage secondary flywheels (10*b*).

When the primary drive shaft (4*a*) is rotated, the primary flywheel (10*a*) is rotated (14, 30). The magnets (21, 28) of primary flywheel (10*a*) repel the magnets (21, 28) of the first-stage secondary flywheel (10*b*) to consequently rotate it in a clockwise direction (15, 31), which ultimately rotates the first stage secondary drive shaft (4*b*) connected to the first-stage secondary flywheel (10*b*). An arrangement where the magnets (28) may attract, to resultingly cause stable rotation of the drive shafts (4*a*, 4*b*), could also be implemented to the flywheels (10*a*, 10*b*). Alternatively, a skilled person would understand that the opposite rotation would also apply with the primary flywheel (10*a*) rotating in a clockwise direction (14, 30) and first-stage secondary flywheel (10*b*) rotating in an anticlockwise direction (15, 31). In some forms, the 'arrow shaped' nature of the magnets may also assist in any contact or interaction of the magnets, so that movement is not hindered should a magnet contact an adjacent magnet.

In some forms, the first-stage secondary flywheel (10*b*) may be partially positioned above or below the primary flywheel (10*a*) so as to utilize the shaping and arrangement of the magnets of the primary and first-stage secondary flywheels of FIGS. 5 and 6.

The embodiment of FIG. 27 can be used to multiply the rotational output of the primary drive shaft. This can be used for applications such as generators, water pumps, as well as air conditioners, to provide different levels of temperature or humidity, by having each of the first-stage secondary flywheels including gears of different sizes to allow for adjustment of energy transmission, amplification, output and/or storage.

A first example is that the embodiment of FIG. 27, or other embodiments disclosed in the specification, can be used in an air conditioning system for a building, where there is a need for supplying varying amounts of hot/cold air to different levels/parts of a building, in order to desirable temperature levels of the building.

Another example is that the embodiment of FIG. 27, or other embodiments disclosed in the specification, may be used in an irrigation system, where there is a need for supplying varying amounts of water to different fields, so that maximum crop yield can be achieved and/or soil health level can be maintained.

Figure 28:
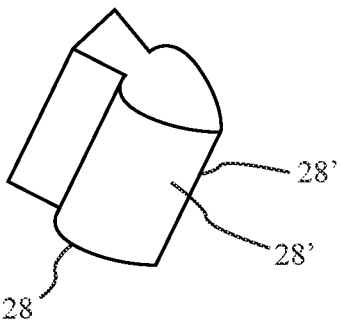
FIG. 28 is a perspective view detailing an arrow shape magnet used in the embodiments illustrated in FIGS. 25 to 27.

FIG. 28 is a perspective view of the arrow shape magnet (28) according to FIGS. 25 to 27. As shown, the one or more magnets (28) may be arrow-shaped prisms and extend downwards to form magnetic vertical surfaces (28') at their free ends. The magnetic vertical surfaces (28') can interact with each other to cause rotation of the first-stage secondary gear-shaped flywheels (29*b*) and the primary planetary ring gear combined flywheel (29*c*), when the primary gear-shaped flywheel (29*a*) are rotated by the primary drive shaft (4*a*) and a motor (3).

The present invention, as disclosed in the specification, incorporates various devices which may be included separately or in combination in seeking to make, or be close to making, the ideal machine. It will be appreciated that various embodiments described in the specification may be used in many different types of machinery, either separately or in combination.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A magnetic bearing assembly, including a substantially vertically disposed rotatable shaft configured to rotate about a rotation axis which is disposed substantially centrally within a shaft hole of a machine body, said magnetic bearing assembly including:

a first magnetic bearing portion associated with said shaft hole of said machine body, including a first magnetic bearing surface which is shaped to face substantially upwardly and inwardly; and, a second magnetic bearing portion associated with said rotatable shaft, including a second magnetic bearing surface which is of complementary shape to said first magnetic bearing surface;

wherein, said magnetic bearing portions are configured to solely exert a repelling force substantially vertically along the rotation axis therebetween to thereby support and levitate said rotatable shaft within said shaft hole of said machine body.

2. The assembly according to claim 1, wherein said magnetic bearing portions are of complementary annular/ring shape such that said rotatable shaft is rotatably balanced within said hole of said machine body.

3. The assembly according to claim 1, wherein:

one end of one of said bearing portions is shaped to include any of a linear or non-linear tapered end section, a convergent or divergent shaped end section, a convex or concave end section, a conical or hemi-spherical end section, or any other shaped end section; and, the other of said bearing portions is shaped to be of a compatible shape so that the adjacent surfaces of the bearings complement each other.

4. The assembly according to claim 1, wherein each said magnetic bearing portion includes a permanent magnet and/or an electromagnet.

5. The assembly according to claim 1, wherein each magnetic bearing portion is either embedded within, formed integrally with, or, fitted to the rotatable shaft of the machine shaft hole.

6. A machine including a machine body and a substantially vertically disposed rotatable shaft which is configured to rotate about a rotation axis which is disposed substantially centrally within a shaft hole of the machine body, the machine including a magnetic bearing assembly as claimed in claim 1.

7. The machine according to claim 6, further including a pair of magnets adapted to cooperate with one another so as to exert a repelling force therebetween and thereby levitate at least a portion of said rotatable shaft.

8. The machine according to claim 6, wherein said magnetic bearing portions are of complementary annular/ring shape such that said rotatable shaft is rotatably balanced within said hole of said machine body.

9. The machine according to claim 6, wherein:

one end of one of said bearing portions is shaped to include any of a linear or non-linear tapered end section, a convergent or divergent shaped end section, a convex or concave end section, a conical or hemi-spherical end section, or any other shaped end section; and, the other of said bearing portions is shaped to be of a compatible shape so that the adjacent surfaces of the bearings complement each other.

10. The machine according to claim 6, wherein each said magnetic bearing portion includes a permanent magnet and/or an electromagnet.

11. The machine according to claim 6, further including a rotatable mass positioned above said bearing assembly on said rotatable shaft.

12. The machine according to claim 11, wherein the rotatable mass is embodied as one or more flywheel embedded with permanent magnets and/or electromagnets.

13. The machine according to claim 11, wherein the rotatable mass includes an energy harvesting apparatus.

14. The machine according to claim 13, wherein said energy harvesting apparatus includes, any one or combination of:

an electric coil apparatus, via which an electric current is induced to flow as said apparatus is rotated; and, a secondary rotatable shaft, which is rotated via repulsion or attraction of magnets embedded therein as said flywheel rotates.

15. The machine according to claim 6, wherein said rotatable shaft is rotated by a drive mechanism, including, but not limited to, a motor, a generator, a wind turbine, or a magnetic coupling device.

16. The machine according to claim 6, further including magnetic gears.

* * * * *